US010601207B2

(12) United States Patent
Takayanagi et al.

(10) Patent No.: US 10,601,207 B2
(45) Date of Patent: Mar. 24, 2020

(54) METHOD OF MANUFACTURING WIRE WITH TERMINAL AND CRIMPING TERMINAL

(71) Applicant: Yazaki Corporation, Tokyo (JP)

(72) Inventors: Masayoshi Takayanagi, Shizuoka (JP); Naoki Ito, Shizuoka (JP); Keiichiroh Kurashige, Shizuoka (JP); Koichi Ikebe, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/782,639

(22) Filed: Oct. 12, 2017

(65) Prior Publication Data

US 2018/0109088 A1    Apr. 19, 2018

(30) Foreign Application Priority Data

Oct. 13, 2016  (JP) ................................. 2016-201870

(51) Int. Cl.
*H02G 1/14*   (2006.01)
*H01R 4/18*   (2006.01)
(Continued)

(52) U.S. Cl.
CPC ............ *H02G 1/145* (2013.01); *H01R 4/185* (2013.01); *H01R 4/188* (2013.01); *H01R 43/048* (2013.01); *H01R 43/052* (2013.01)

(58) Field of Classification Search
CPC ...... H01R 43/048; H01R 43/0482–055; H01R 4/185; H01R 43/052; H01R 4/188; H02G 1/145
(Continued)

(56) References Cited

U.S. PATENT DOCUMENTS 4,067,105 A * 1/1978 Zahn ...................... H01R 43/04
                                              29/869
5,500,999 A    3/1996 Yagi et al.
(Continued)

FOREIGN PATENT DOCUMENTS

CN         1183662 A      6/1998
CN       101997176 A      3/2011
(Continued)

OTHER PUBLICATIONS

Japanese Office Action for the related Japanese Patent Application No. 2016-201870 dated Sep. 4, 2018.
(Continued)

*Primary Examiner* — Peter Dungba Vo
*Assistant Examiner* — Kaying Kue
(74) *Attorney, Agent, or Firm* — Kenealy Vaidya LLP

(57) ABSTRACT

A method of manufacturing a wire with a terminal includes a crimping process of crimping a crimping terminal on a wire by a terminal crimping apparatus that includes a first mold including a supporting surface supporting the crimping terminal, and a second mold disposed to face the supporting surface and including a recessed wall surface. The recessed wall surface includes a first wall surface and a second wall surface, and a third wall surface curved toward an opposite side of the supporting surface. The first wall surface and the second wall surface include inclined portions and parallel portions. The inclined portions are inclined with respect to the stroke direction so that an interval in the width direction becomes narrower toward the third wall surface. The parallel portions are parallel to the stroke direction. In the crimping process, the side wall surfaces of the first mold face the inclined portions in a state in which the first mold and the second mold come closest to each other in the stroke direction.

3 Claims, 18 Drawing Sheets

(51) Int. Cl.
  *H01R 43/048*  (2006.01)
  *H01R 43/052*  (2006.01)

(58) Field of Classification Search
  USPC .................................. 29/867, 863, 861, 857
  See application file for complete search history.

(56) References Cited

U.S. PATENT DOCUMENTS

| | | | | |
|---|---|---|---|---|
| 5,561,267 A * | 10/1996 | Fudoo | .................... | H01R 4/185 174/84 C |
| 6,193,138 B1 * | 2/2001 | Wada | .................... | H01R 43/048 228/115 |
| 6,360,436 B1 | 3/2002 | Takada | | |
| 6,513,695 B2 * | 2/2003 | Yamakawa | ............ | B23K 20/02 228/3.1 |
| 6,880,240 B2 * | 4/2005 | Kitagawa | ............ | H01R 43/048 29/751 |
| 8,210,884 B2 * | 7/2012 | Corman | ................ | H01R 4/185 439/877 |
| 8,628,363 B2 * | 1/2014 | Kobayashi | ............ | H01R 4/185 439/877 |
| 8,721,855 B2 * | 5/2014 | Nishio | ............... | G01N 27/4071 204/424 |
| 9,252,505 B2 * | 2/2016 | Otsuka | .................. | H01R 4/185 |
| 2002/0029472 A1 * | 3/2002 | Takada | ................ | H01R 43/055 29/861 |
| 2011/0034091 A1 | 2/2011 | Kobayashi et al. | | |
| 2012/0192614 A1 | 8/2012 | Battenfeld | | |
| 2013/0252481 A1 * | 9/2013 | Sato | ......................... | H01R 4/70 439/736 |
| 2014/0033520 A1 * | 2/2014 | Nakagishi | ............ | H01R 43/048 29/753 |
| 2014/0235117 A1 * | 8/2014 | Sato | ....................... | H01R 4/184 439/877 |

FOREIGN PATENT DOCUMENTS

| | | |
|---|---|---|
| JP | 48-31825 Y | 9/1973 |
| JP | 6-45047 A | 2/1994 |
| JP | 7-73950 A | 3/1995 |
| JP | 8-213142 A | 8/1996 |
| JP | 2012-160449 A | 8/2012 |
| JP | 2013-89554 A | 5/2013 |

OTHER PUBLICATIONS

Chinese Office Action for the related Chinese Patent Application No. 201710948467.2 dated Dec. 20, 2018.
Chinese Office Action for the related Chinese Patent Application No. 201710948467.2 dated Apr. 16, 2019.

* cited by examiner

METHOD OF MANUFACTURING WIRE WITH TERMINAL AND CRIMPING TERMINAL

CROSS-REFERENCE TO RELATED APPLICATION(S)

The present application claims priority to and incorporates by reference the entire contents of Japanese Patent Application No. 2016-201870 filed in Japan on Oct. 13, 2016.

BACKGROUND OF THE INVENTION

1. Field of the Invention

The present invention relates to a method of manufacturing a wire with a terminal and a crimping terminal.

2. Description of the Related Art

There has been conventionally a terminal crimping apparatus that crimps a crimping terminal onto a wire. For example, Japanese Patent Application Laid-open No. H6-45047 discloses a technique of a terminal swaging apparatus that crimps an electrical connector onto a wire using a crimping tooth-shaped mold and a lower mold to be fitted with a recessed portion of the crimping tooth-shaped mold. In the terminal swaging apparatus of Japanese Patent Application Laid-open No. H6-45047, the crimping tooth-shaped mold has straight guide walls to guide the lower mold that are provided in the recessed portion, and crimping of the electrical connector is performed within a range of the straight guide walls. The terminal swaging apparatus of Japanese Patent Application Laid-open No. H6-45047 is assumed to be able to prevent the generation of rear burr in the electrical connector.

Here, if a large force is required when a crimping terminal crimped onto a wire is taken out from a mold, an excess load is applied to the crimping terminal. This leads to such a problem that deformation of the crimping terminal and the like are caused. For example, if the crimped crimping terminal after crimped is sandwiched by parallel wall surfaces, force required for taking out the crimping terminal tends to be large. It is demanded that force required for taking out the crimped crimping terminal can be reduced.

SUMMARY OF THE INVENTION

The object of the present invention is to provide a method of manufacturing a wire with a terminal and a crimping terminal that can reduce force required for taking out a crimped crimping terminal.

In order to achieve the above mentioned object, a method of manufacturing a wire with a terminal according to one aspect of the present invention includes crimping process of crimping a crimping terminal on a wire by a terminal crimping apparatus that includes a first mold including a supporting surface that supports the crimping terminal including a wire connection portion having a bottom wall portion and a pair of side wall portions that faces each other in a width direction of the bottom wall portion and protrudes from both ends in the width direction of the bottom wall portion, a second mold disposed to face the supporting surface, and including a recessed wall surface opened toward the supporting surface, on a surface facing the supporting surface, and a driving device configured to reciprocate the second mold in a stroke direction being a direction in which the supporting surface and the second mold face each other, wherein the recessed wall surface includes a first wall surface and a second wall surface that are configured to face side wall surfaces of the first mold, and are facing each other in the width direction, and a third wall surface connecting the first wall surface and the second wall surface, and curved toward an opposite side to the supporting surface, the first wall surface and the second wall surface include inclined portions and parallel portions, the inclined portions are positioned at end portions of the third wall surface side on the first wall surface and the second wall surface, and inclined with respect to the stroke direction so that an interval in the width direction becomes narrower as going to the third wall surface, the parallel portions extend from the inclined portions toward an opposite side to the third wall surface side, and are parallel to the stroke direction, and in the crimping process, the side wall surfaces of the first mold face the inclined portions in a state in which the first mold and the second mold come closest to each other in the stroke direction.

According to another aspect of the present invention, the terminal crimping apparatus may further include a wire holding mechanism configured to move toward the first mold together with the second mold while holding a crimping target wire, wherein the parallel portions face the side wall surfaces of the first mold side at a time point at which a core wire of the wire is accommodated into an inner space portion of the pair of side wall portions.

According to still another aspect of the present invention, the terminal crimping apparatus may further include a wire holding mechanism configured to move toward the first mold together with the second mold while holding a crimping target wire, wherein the parallel portions face the side wall surfaces of the first mold side at a time point at which the wire comes into contact with the bottom wall portion.

A crimping terminal according to still another aspect of the present invention includes a bottom wall portion, and a pair of side wall portions protruding from both ends in a width direction of the bottom wall portion, and configured to be crimped onto a wire while overlapping, wherein, in a cross section perpendicular to the wire, outer contours of the side wall portions crimped onto the wire include curved portions formed on distal end sides of the side wall portions, and inclined portions connecting the curved portions and the bottom wall portion, and spreading in the width direction as going to the bottom wall portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A terminal crimping apparatus that carries out a method of manufacturing a wire with a terminal and a crimping terminal according to an embodiment of the present invention will be described in detail below with reference to the drawings. In addition, the present invention is not limited to the embodiment. In addition, components in the following embodiment include the ones easily-conceived by those skilled in the art, or the ones that are substantially identical.

Embodiment

Figure 12:
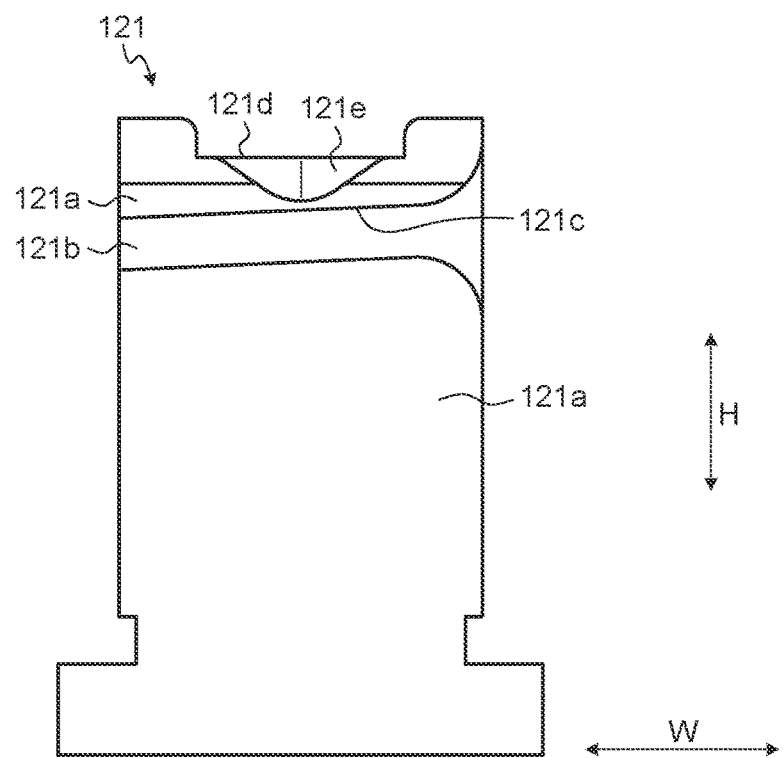
FIG. 12 is a rear view illustrating the terminal cutting member according to the embodiment.
Figure 13:
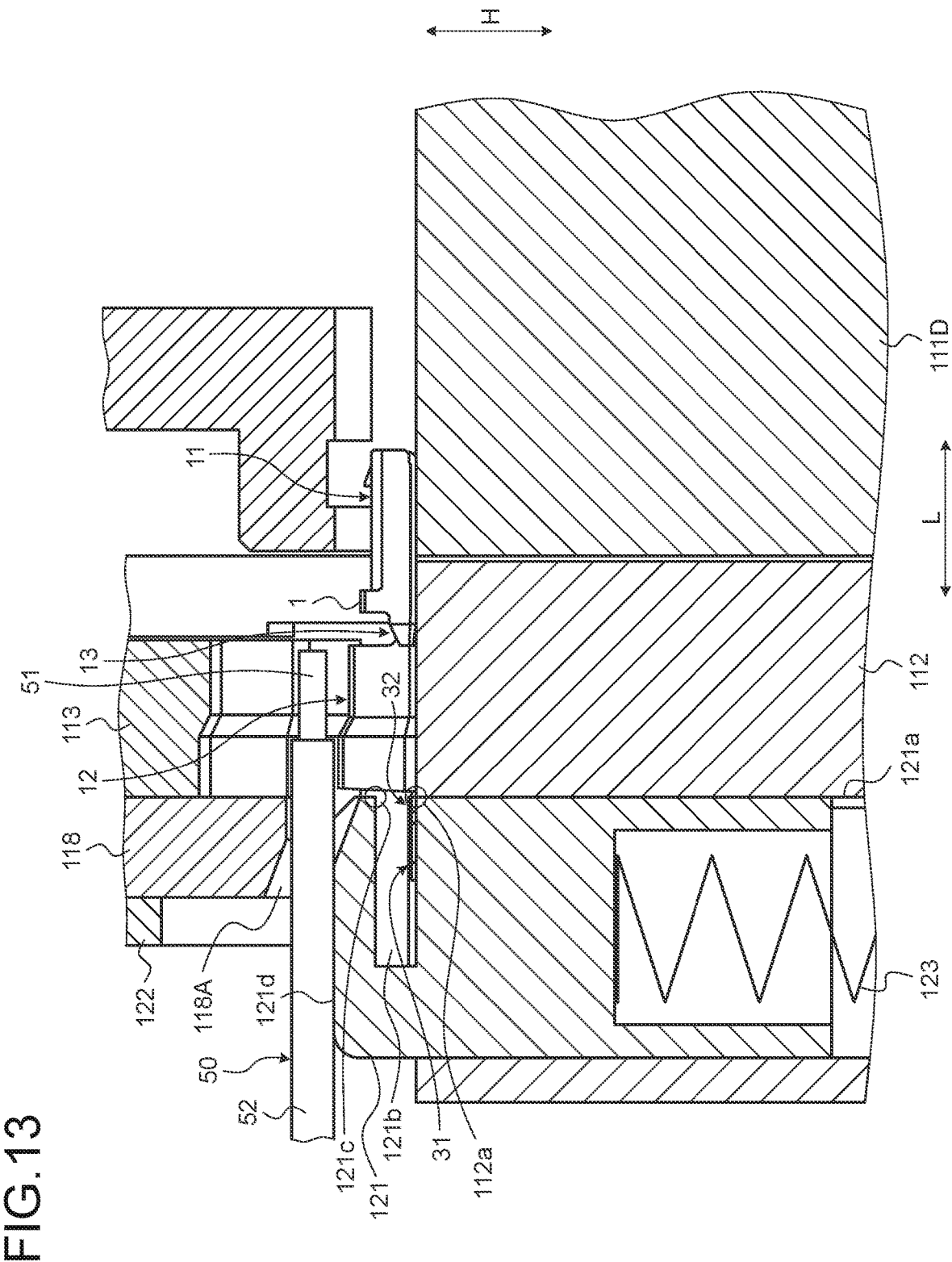
FIG. 13 is a cross-sectional view illustrating a state in which a wire and the crimping terminal are set in the terminal crimping apparatus according to the embodiment.

The embodiment will be described with reference to FIGS. 1 to 23. The present embodiment relates to a terminal crimping apparatus that carries out a method of manufacturing a wire with a terminal and a crimping terminal. In addition, FIG. 13 illustrates an XIII-XIII cross section shown in FIG. 9.

First of all, a crimping terminal 1 according to the present embodiment will be described. The crimping terminal 1 illustrated in FIG. 1 and the like is a terminal to be crimped onto a wire 50. The crimping terminal 1 is electrically-connected to another terminal (not illustrated) in a state of being integrated with the wire 50. A covering 52 located on an end portion of the wire 50 as a crimping target is removed, and a core wire 51 is exposed by a predetermined length. The core wire 51 may be an aggregate of a plurality of wires, or may be a single wire such as a coaxial cable. By being crimped to the end portion of the wire 50, the crimping terminal 1 is electrically connected to the exposed core wire 51.

The crimping terminal 1 includes a terminal fitting 10 and a water stop member 20. The terminal fitting 10 is a main portion of the crimping terminal 1. The terminal fitting 10 is formed of a conductive metal plate serving as a base material (e.g., copper plate). The terminal fitting 10 is formed into a predetermined shape that enables connection to the other terminal and the wire 50, through punching processing, bending processing, and the like that are performed on the base material. The terminal fitting 10 includes a terminal connection portion 11 and a wire connection portion 12. The terminal connection portion 11 is a portion to be electrically-connected to the other terminal. The wire connection portion 12 is a portion to be crimped onto the wire 50, and is electrically connected to the core wire 51. A joint portion 13 is provided between the terminal connection portion 11 and the wire connection portion 12. In other words, the terminal connection portion 11 and the wire connection portion 12 are joined via the joint portion 13. The joint portion 13 includes side walls 13a and 13a that connect side walls 11a and 11a of the terminal connection portion 11 and first and second barrel piece portions 15 and 16 being side walls of the wire connection portion 12. One side wall 13a connects one side wall 11a and the first barrel piece portion 15, and the other side wall 13a connects the other side wall 11a and the second barrel piece portion 16. A height of the side walls 13a is lower than heights of the first and second barrel piece portions 15 and 16, and the side walls 11a. More specifically, the height of the side walls 13a becomes lower from the terminal connection portion 11 as going to the wire connection portion 12.

The terminal fitting 10 may be a male terminal or a female terminal. When the terminal fitting 10 is a male terminal, the terminal connection portion 11 is molded into a male die, and when the terminal fitting 10 is a female terminal, the terminal connection portion 11 is molded into a female die.

In the description of the crimping terminal 1, a direction in which the crimping terminal 1 is connected to the other terminal, that is, a direction in which the crimping terminal 1 is inserted into the other terminal will be referred to as a first direction L. The first direction L is a longitudinal direction of the crimping terminal 1. A parallel arrangement direction of the crimping terminals 1 will be referred to as a second direction W. As described later, the parallel arrangement direction is a direction in which the crimping terminals 1 are arranged in parallel in a terminal chain member 30, and is a width direction of the crimping terminal 1. In the crimping terminal 1, a direction perpendicular to both of the first direction L and the second direction W will be referred to as a third direction H. The third direction H is a height direction of the crimping terminal 1.

Figure 1:
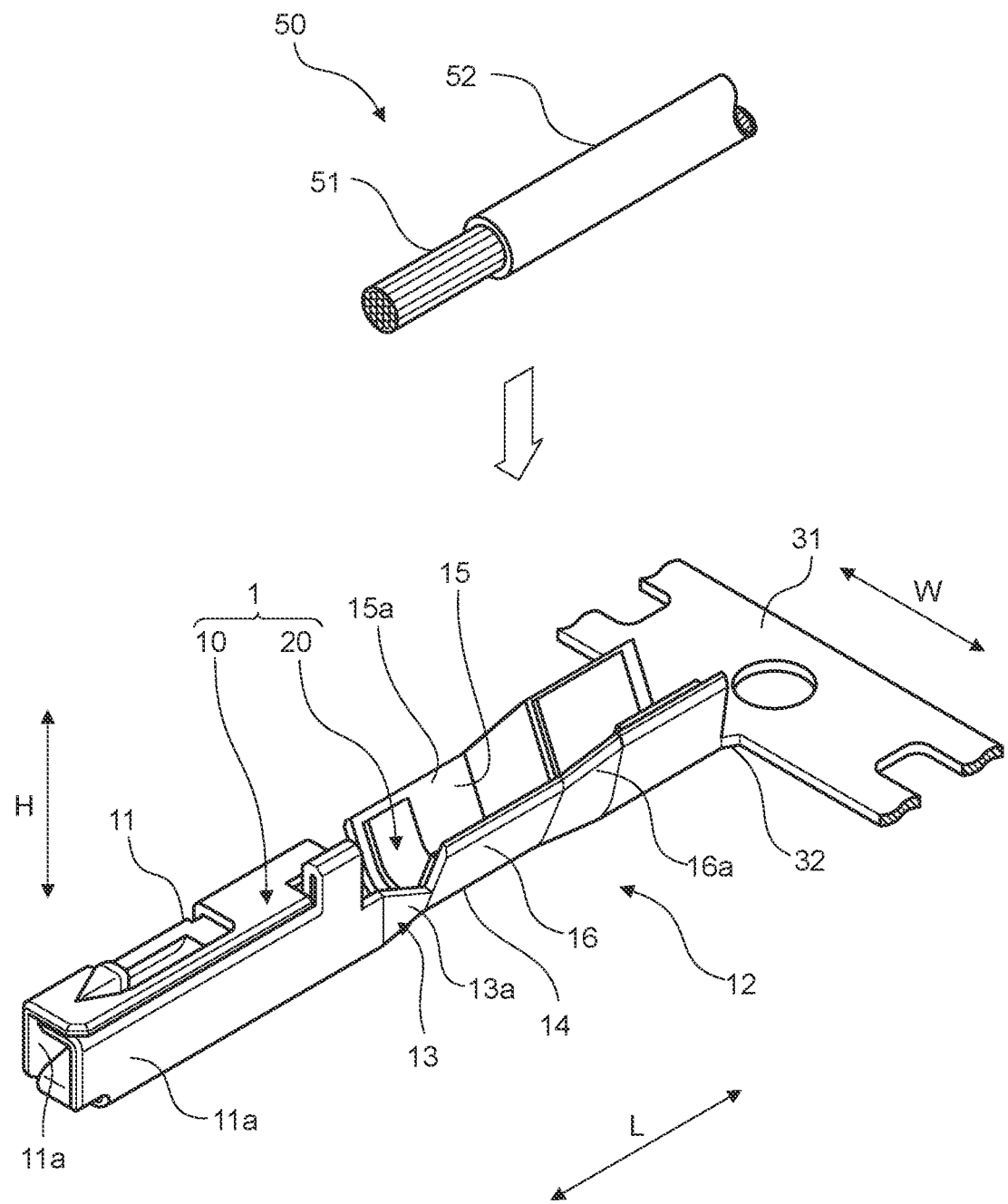
FIG. 1 is a perspective view illustrating a state before crimping of a crimping terminal according to an embodiment.
Figure 2:
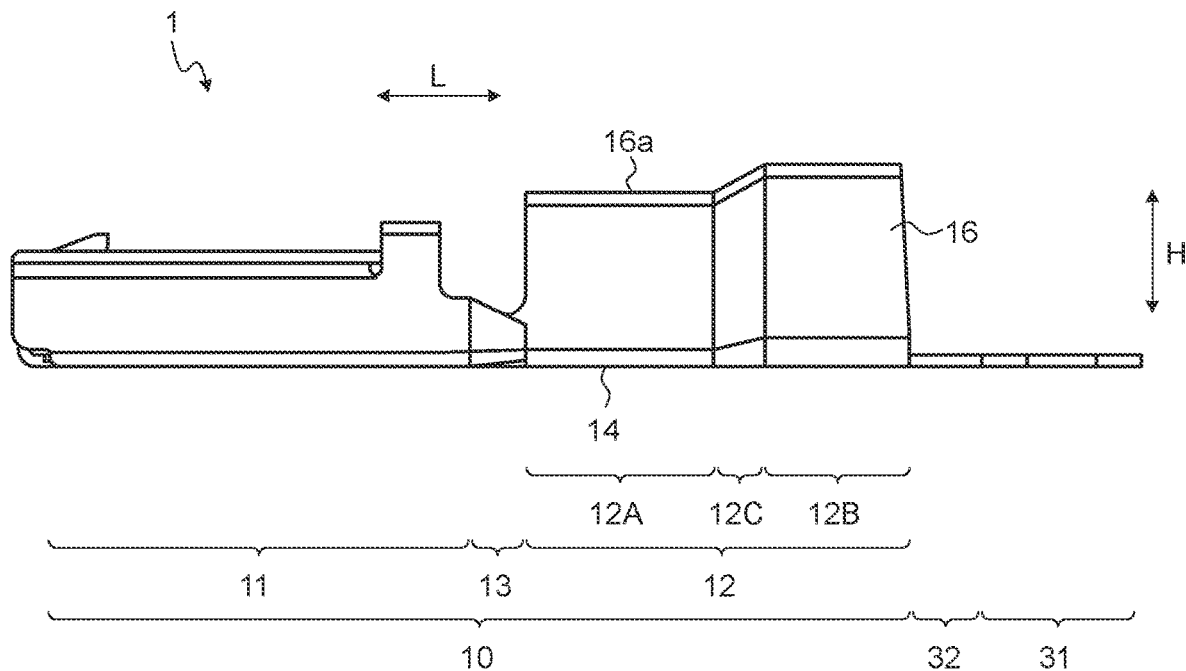
FIG. 2 is a side view illustrating the state before crimping of the crimping terminal according to the embodiment.
Figure 3:
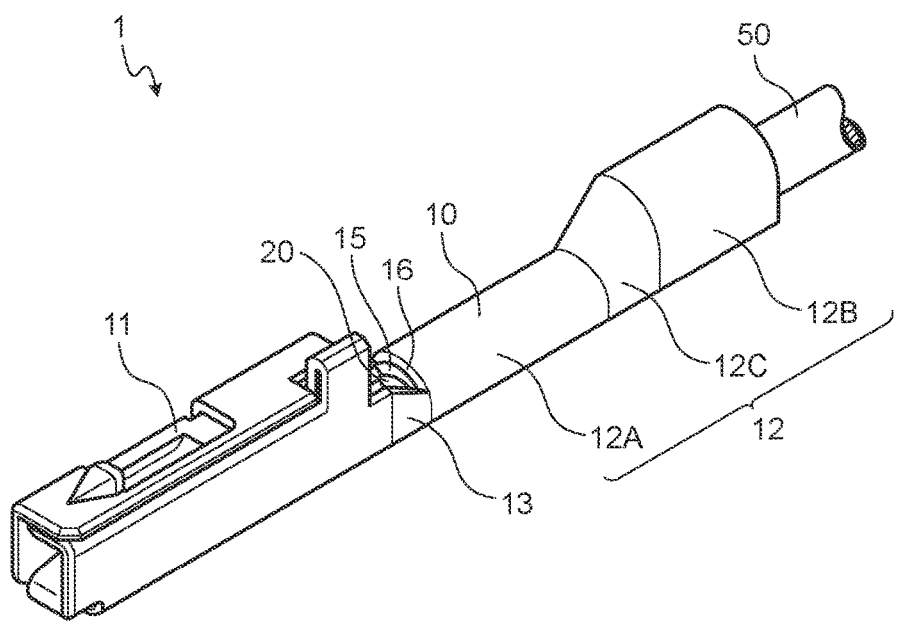
FIG. 3 is a perspective view illustrating the crimping terminal according to the embodiment that is obtainable after crimping.
Figure 4:
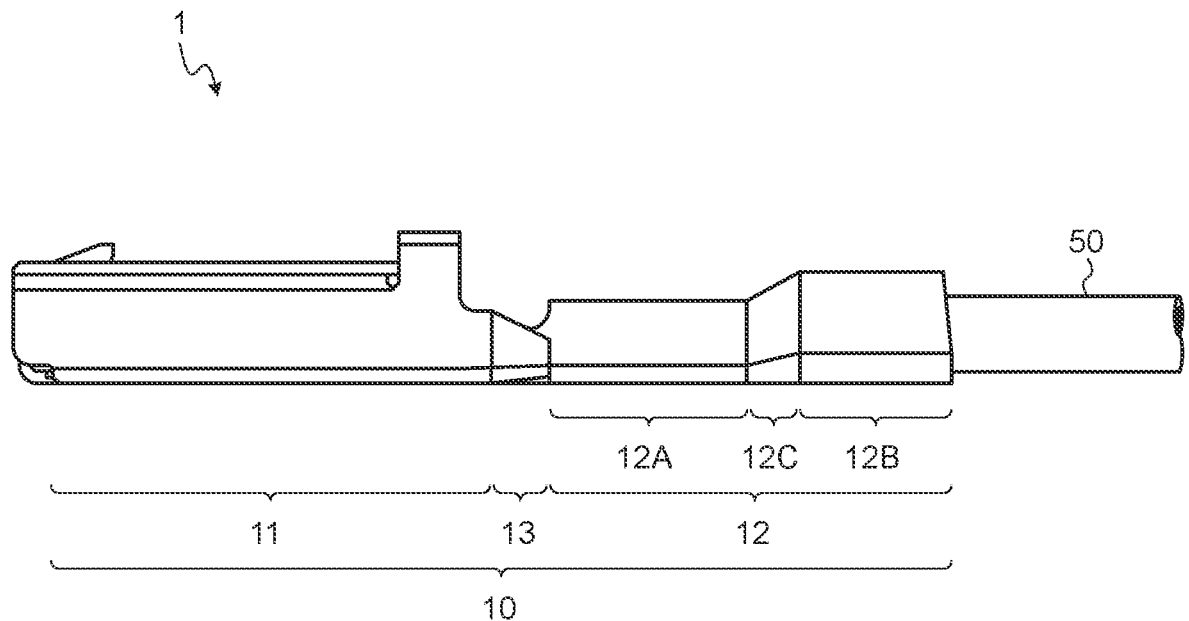
FIG. 4 is a side view illustrating the crimping terminal according to the embodiment that is obtainable after crimping.

In a molding process, the crimping terminal 1 is molded into a flat plate shape, and from this state, in a terminal connection portion shaping process, the terminal connection portion 11 is formed into a tubular shape as illustrated in FIG. 1. In the terminal connection portion shaping process, bending processing and the like are performed on the terminal connection portion 11. The terminal connection portion 11 of the present embodiment is formed into a tubular shape having an oblong cross-sectional shape. In a wire connection portion shaping process, the wire connection portion 12 is molded so as to have a U-shaped cross-sectional shape. In the wire connection portion shaping process, the bending processing and the like are performed on the wire connection portion 12. In addition, the water stop member 20 is attached to the wire connection portion 12 in an attaching process. The attaching process may be executed before the wire connection portion shaping process, or may be executed after the wire connection portion shaping process.

Figure 6:
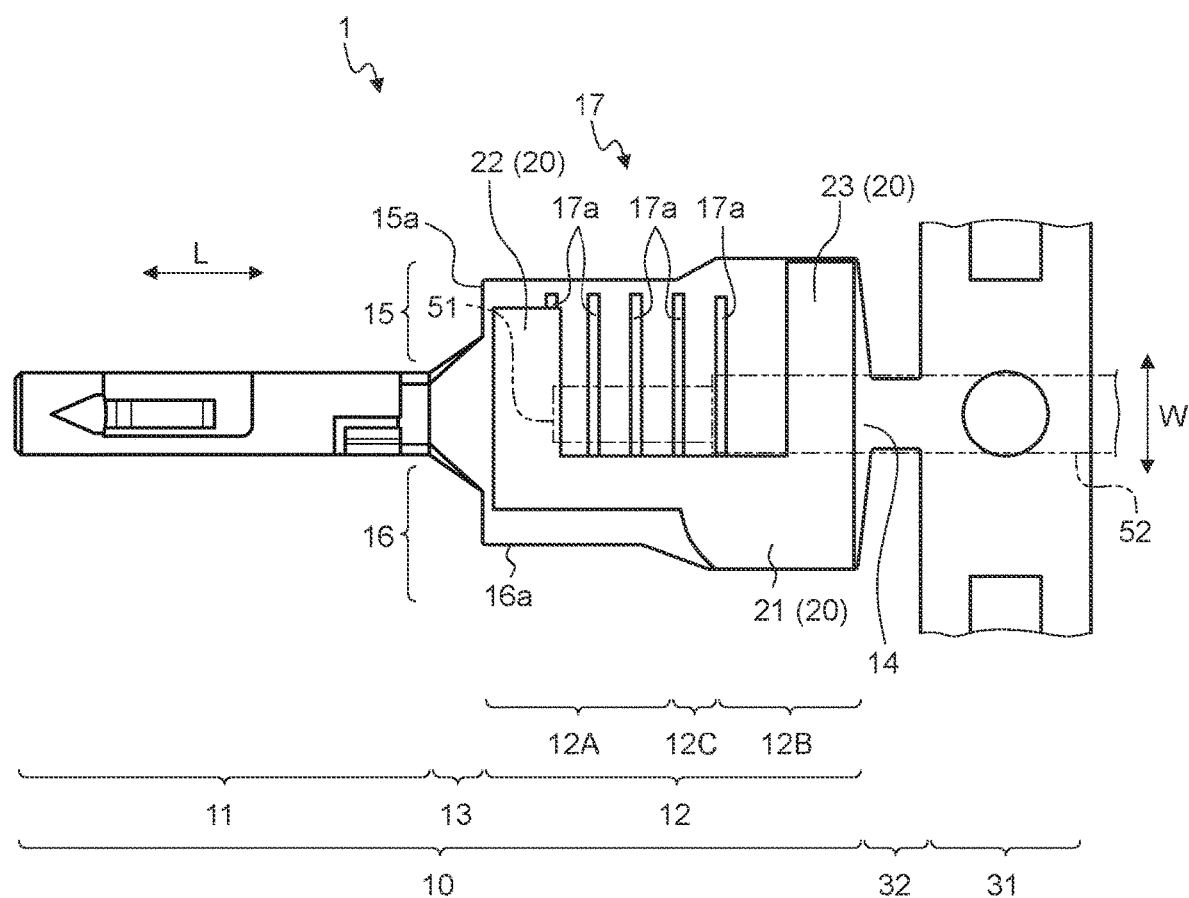
FIG. 6 is a plan view illustrating a state in which a water stop member is attached in the crimping terminal according to the embodiment.

As illustrated in FIGS. 1 and 6, the wire connection portion 12 includes a bottom portion 14, the first barrel piece portion 15, and the second barrel piece portion 16. The bottom portion 14 is a region serving as a bottom wall of the wire connection portion 12 formed into the U-shape. In crimping processing, the end portion of the wire 50 is placed on the bottom portion 14. The first barrel piece portion 15 and the second barrel piece portion 16 are regions serving as side walls of the wire connection portion 12 formed into the U-shape. The first barrel piece portion 15 and the second barrel piece portion 16 are connected to end portions in the second direction W of the bottom portion 14. The first barrel piece portion 15 and the second barrel piece portion 16 protrude from the end portions in the width direction of the bottom portion 14, toward directions intersecting with the width direction. In the wire connection portion 12 formed into the U-shape, when the end portion of the wire 50 is placed on the bottom portion 14, the first barrel piece portion 15 and the second barrel piece portion 16 surround the wire 50 from both sides in the second direction W.

Lengths from roots on the bottom portion 14 side to end surfaces of distal ends 15a and 16a of the first barrel piece portion 15 and the second barrel piece portion 16 may be equal to each other, or one length may be longer than the other length. In the crimping terminal 1 of the present embodiment, the length from the root to the distal end 16a of the second barrel piece portion 16 is longer than the length from the root to the distal end 15a of the first barrel piece portion 15. For example, the first barrel piece portion 15 and the second barrel piece portion 16 are winded around the wire 50 while overlapping each other. In the present embodiment, the second barrel piece portion 16 overlaps on the outside of the first barrel piece portion 15. In addition, swaging referred to as so-called B crimping (swaged in a B-character shape) may be performed on the first barrel piece portion 15 and the second barrel piece portion 16. In the B crimping, both of the first barrel piece portion 15 and the second barrel piece portion 16 are bent toward the bottom portion 14 side, and swaged so that the distal ends 15a and 16a are pressed against the wire 50. Because the crimping terminal 1 of the present embodiment is provided with the water stop member 20 to be described later, the former swaging processing is employed.

The end portion of the wire 50 is inserted into a U-shaped inner space from a U-shaped opening portion of the wire connection portion 12, that is, from a clearance gap between the distal ends 15a and 16a. The wire connection portion 12 is formed so that the end portion of the wire 50 can be easily inserted. More specifically, in the wire connection portion 12, a distance in the second direction W between the first barrel piece portion 15 and the second barrel piece portion 16 widens from the bottom portion 14 side as going to the end surfaces of the distal ends 15a and 16a.

As illustrated in FIGS. 2 to 6, in the first barrel piece portion 15 and the second barrel piece portion 16, a joint crimping portion 12C interposes between a core wire crimping portion 12A and a covering crimping portion 12B. Each of the first barrel piece portion 15 and the second barrel piece portion 16 is one piece portion in which the crimping portions 12A, 12C, and 12B are consecutively arranged in the first direction L in this order.

The core wire crimping portion 12A is a region to be crimped onto the core wire 51 at the distal end of the wire 50. The core wire crimping portion 12A is a region closest to the joint portion 13 in each of the barrel piece portions 15 and 16. The covering crimping portion 12B is a region to be crimped onto an end portion of the covering 52. The covering crimping portion 12B is a region positioned on the farthest side from the joint portion 13 side in each of the barrel piece portions 15 and 16. The joint crimping portion 12C is a region connecting the core wire crimping portion 12A and the covering crimping portion 12B. The joint crimping portion 12C is crimped onto a boundary portion between the core wire 51 and the covering 52 of the wire 50. By being crimped onto the wire 50, the wire connection portion 12 integrally covers the core wire 51 and the covering 52.

Figure 5:
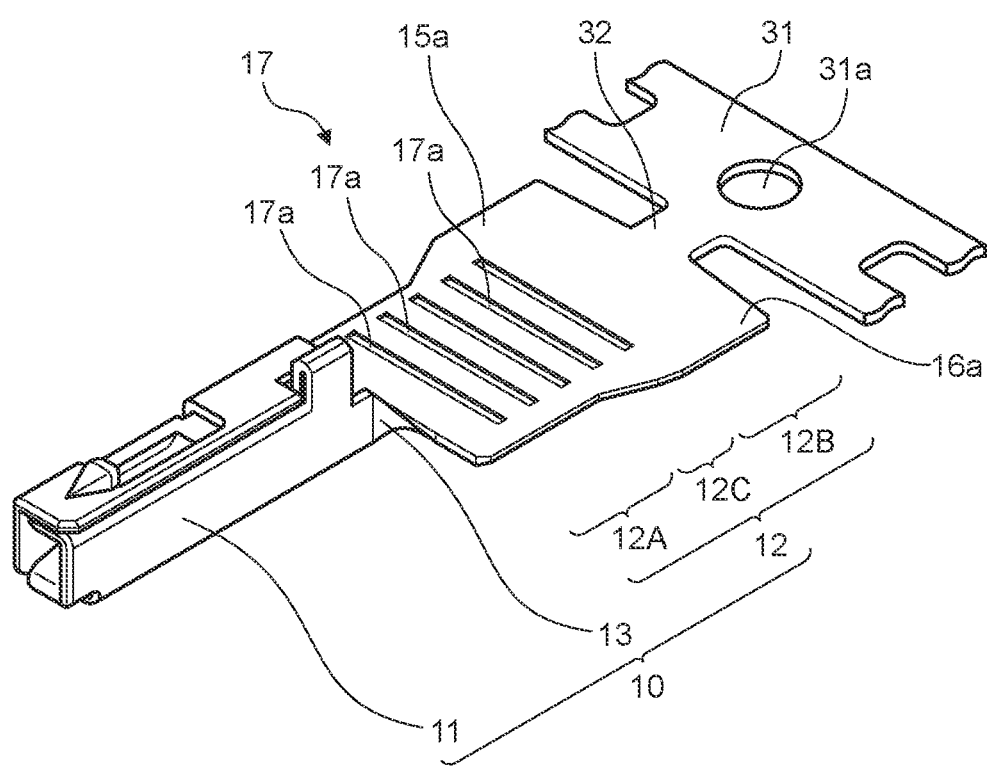
FIG. 5 is a perspective view illustrating a state before that bending processing of a wire connection portion is performed in the crimping terminal according to the embodiment.

As illustrated in FIGS. 5 and 6, a serration region 17 is provided on an inner wall surface of the wire connection portion 12, that is, on a wall surface on the side covering the wire 50. The serration region 17 is a core wire holding region that holds the core wire 51. The serration region 17 is a region on the inner wall surface of the wire connection portion 12 that includes a portion to be winded around the core wire 51. A plurality of recessed portions, a plurality of projection portions, or combinations of the recessed portions and the projection portions are arranged on the serration region 17. The recessed portions and the projection portions increase a contact area between the wire connection portion 12 and the core wire 51 to increase the strength of adhesion therebetween. The serration region 17 of the present embodiment is an oblong region, and a plurality of recessed portions 17a are formed at positions different from each other in the first direction L.

Here, ingress of water between the core wire 51 and the wire connection portion 12 crimped onto the core wire 51 is not preferable. For example, when the metal material of the core wire 51 and the metal material of the wire connection portion 12 have different-sized ionization tendencies, corrosion may occur. As an example, when the material of the core wire 51 is aluminum, and the material of the wire connection portion 12 is copper, the core wire 51 may corrode. The crimping terminal 1 of the present embodiment is provided with the water stop member 20. The water stop member 20 suppresses ingress of water between the wire connection portion 12 and the core wire 51.

For example, the water stop member 20 is a member formed into a sheet mainly containing adhesive such as acrylic adhesive. As the water stop member 20 of the present embodiment, an adhesive sheet being formed of sheet-like nonwoven cloth saturated with adhesive, and having an adhesive effect on the both sides is used.

For example, the water stop member 20 is attached onto the inner wall surface of the flat-plate-shaped wire connection portion 12 illustrated in FIG. 5. As illustrated in FIG. 6, the water stop member 20 is formed into a predetermined shape, and includes a first water stop portion 21, a second water stop portion 22, and a third water stop portion 23.

After the completion of crimping, the first water stop portion 21 stops water ingress into an overlapping portion of the first barrel piece portion 15 and the second barrel piece portion 16. More specifically, the first water stop portion 21 forms a water stop region between the barrel piece portions 15 and 16 by being sandwiched between the first barrel piece portion 15 and the second barrel piece portion 16 overlapping each other. The first water stop portion 21 of the present embodiment is disposed in the second barrel piece portion 16, and extends in the first direction L.

The second water stop portion 22 stops water ingress of water or the like into a portion on the terminal connection portion 11 side from the distal end of the core wire 51. The second water stop portion 22 is disposed at an end portion on the terminal connection portion 11 side of the wire connection portion 12, and extends in the second direction W. At least part of the second water stop portion 22 is desirably provided in a region in which the core wire 51 is placed. For example, the second water stop portion 22 forms a water stop region in a clearance gap between the barrel piece portions 15 and 16 by being sandwiched between the overlapping barrel piece portions 15 and 16. The second water stop portion 22 can also block a clearance gap provided on the terminal connection portion 11 side from the distal end of the core wire 51, by overlapping each other in a crimping process. The second water stop portion 22 suppresses ingress of water between the wire connection portion 12 and the core wire 51 from the terminal connection portion 11 side.

The third water stop portion 23 suppresses ingress of water from a clearance gap between the wire connection portion 12 and the covering 52. The third water stop portion 23 is disposed at an end portion on an opposite side of the terminal connection portion 11 side of the wire connection portion 12, and extends in the second direction W. The third water stop portion 23 forms a water stop region between the covering 52 and the wire connection portion 12 by being sandwiched between the covering 52 and the wire connection portion 12.

Through a press process performed on one metal plate serving as a base material, the above-described terminal fitting 10 is processed into a configuration having the flat-plate-shaped wire connection portion 12 illustrated in FIG. 5. In the subsequent attaching process, the water stop member 20 is attached to the flat-plate-shaped wire connection portion 12. After that, in the terminal fitting 10, in a bending process, the terminal connection portion 11 is formed, and the U-shaped wire connection portion 12 is formed.

Figure 7:
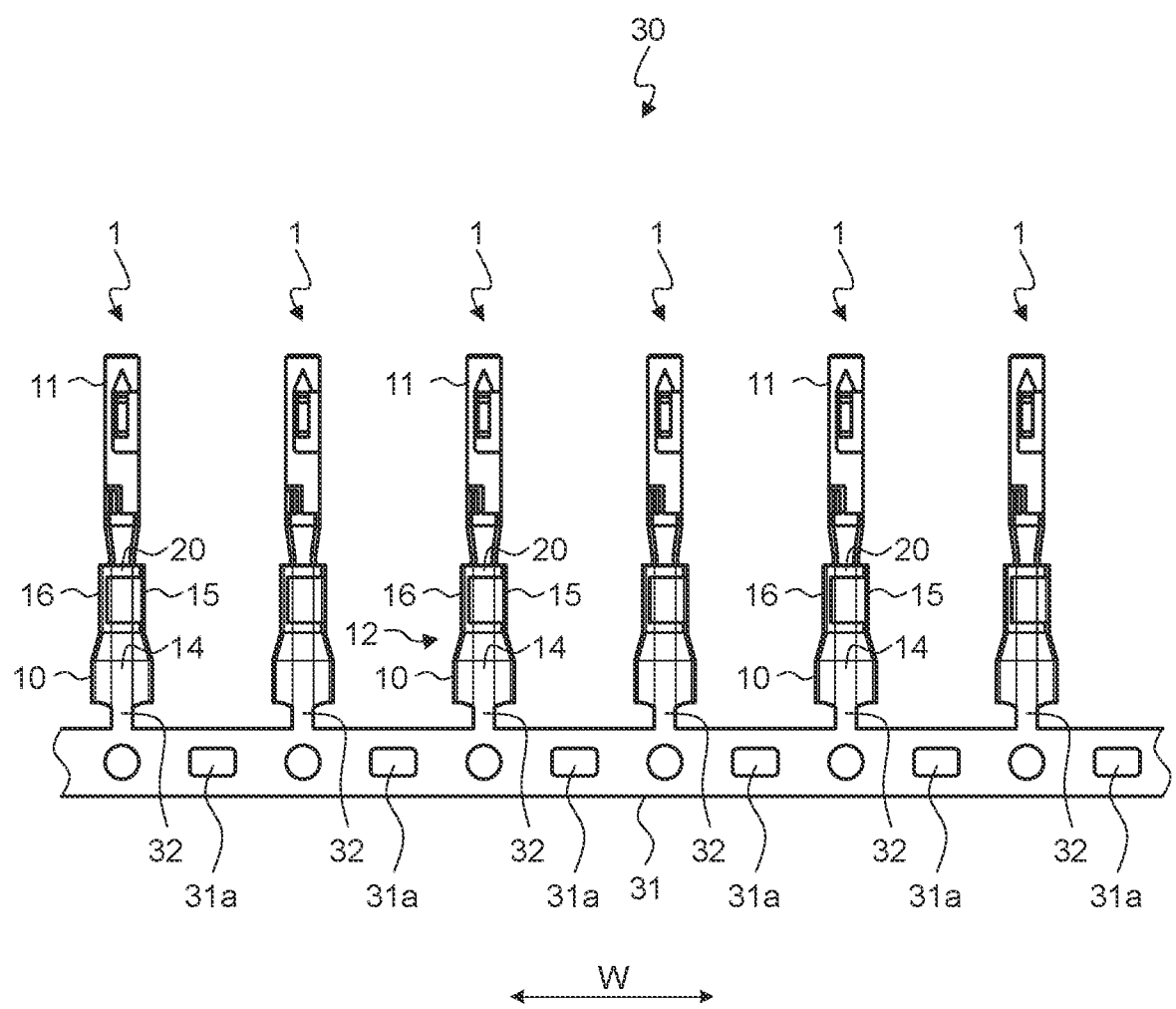
FIG. 7 is a plan view illustrating a terminal chain member according to the embodiment.

In the present embodiment, the terminal chain member 30 illustrated in FIG. 7 is formed through the press process and the bending process. The terminal chain member 30 is obtained by chaining a plurality of the crimping terminals 1, and is formed of one metal plate. The terminal chain member 30 is supplied to a terminal crimping apparatus 100. The terminal crimping apparatus 100 executes the crimping process and a terminal cutting process on the terminal chain member 30. The crimping process is a process of swaging and crimping the crimping terminal 1 of the terminal chain member 30 onto the wire 50. More specifically, in the crimping process, the crimping terminal 1 is crimped on the wire 50 by the terminal crimping apparatus 100. The terminal cutting process is a process of cutting off the crimping terminal 1 swaged to the wire 50, from the terminal chain member 30.

The terminal chain member 30 is an aggregate of the crimping terminals 1. The terminal chain member 30 includes a joint piece 31, the plurality of crimping terminals 1, and a plurality of link portions 32. The joint piece 31, the crimping terminals 1, and the link portions 32 are integrally formed of the same base material. In the terminal chain member 30, the crimping terminals 1 are oriented in the same direction, and arranged in parallel at equal intervals. In the terminal chain member 30, one end portions of the respective crimping terminals 1 are connected to each other by the joint piece 31. For example, the shape of the joint piece 31 is a thin and long oblong plate shape. The joint piece 31 extends in the second direction W. The wire connection portions 12 are connected to the joint piece 31 via the link portions 32. More specifically, the link portions 32 connect the end portions on the opposite side of the terminal connection portion 11 side of the bottom portions 14 to the joint piece 31.

A plurality of terminal feeding holes 31a is formed in the joint piece 31. The terminal feeding holes 31a are arranged at equal intervals in a feeding direction of the terminal chain member 30. The terminal feeding holes 31a are through-holes penetrating through the joint piece 31 in a plate thickness direction. The crimping terminals 1 are positioned by the terminal feeding holes 31a on a crimping device 102 to be described later. The terminal chain member 30 is set into the terminal crimping apparatus 100 in a state of being winded up in a reel shape.

Figure 8:
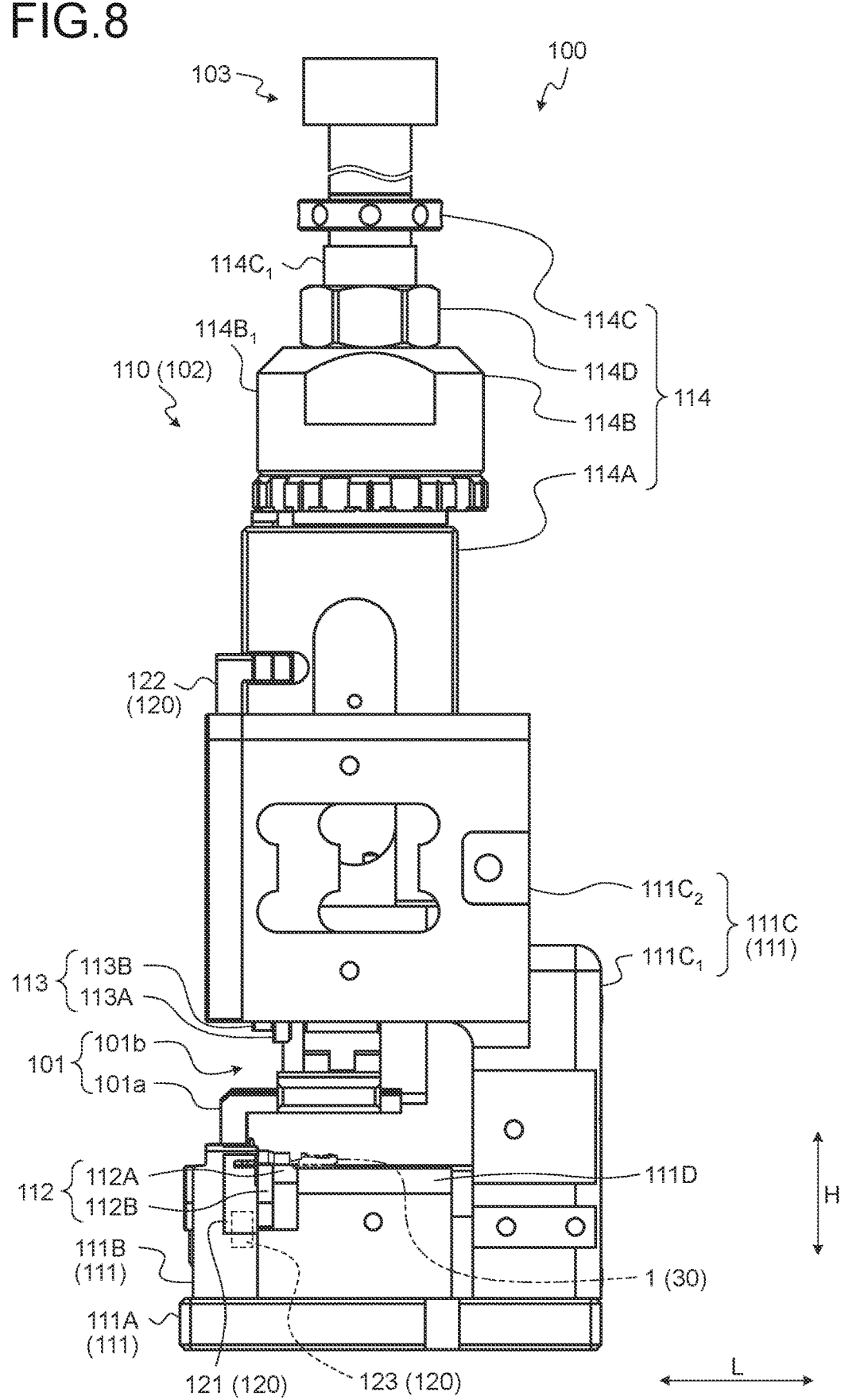
FIG. 8 is a side view of a terminal crimping apparatus that carries out a method of manufacturing a wire with a terminal according to the embodiment.
Figure 9:
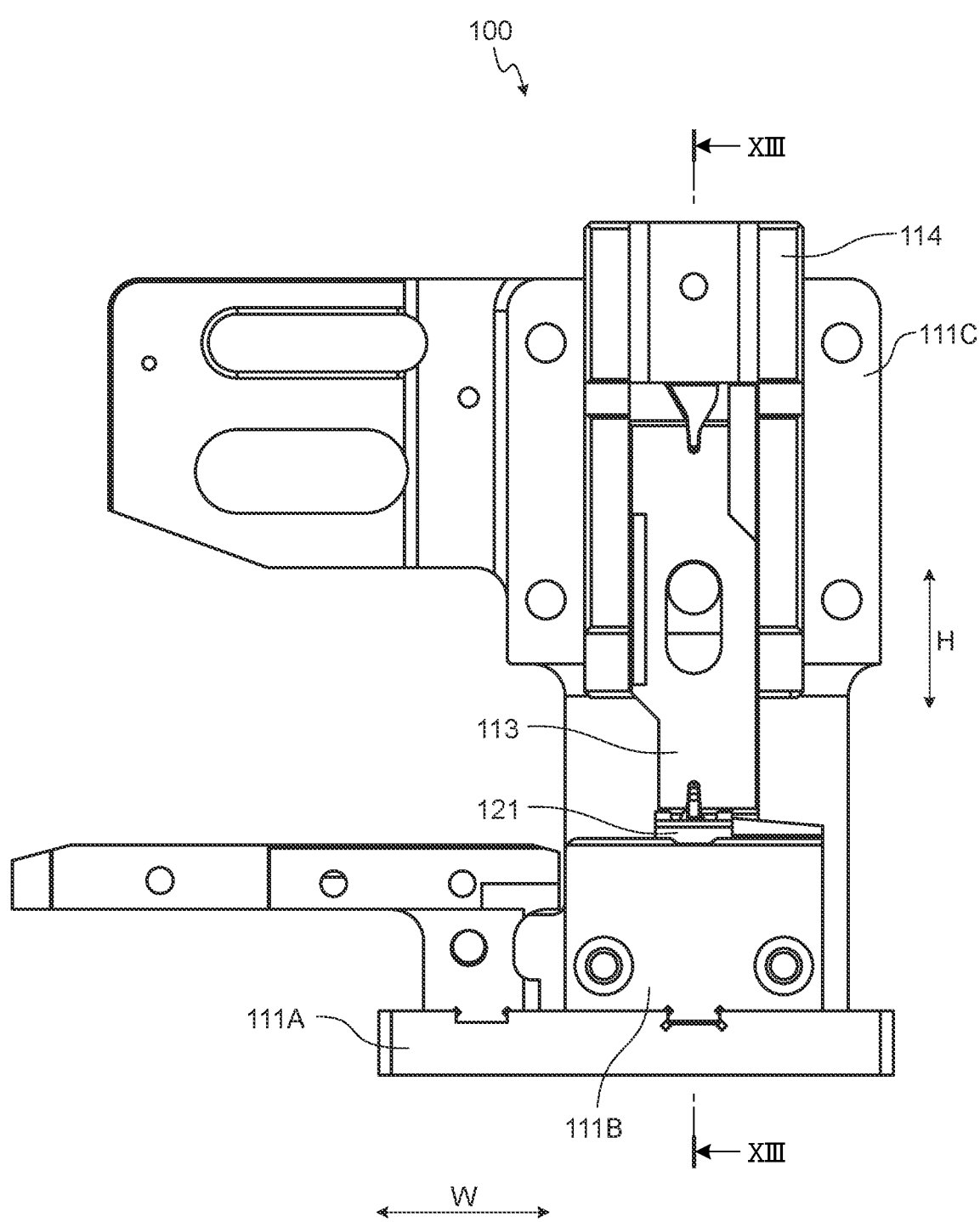
FIG. 9 is a front view of the terminal crimping apparatus according to the embodiment.

As illustrated in FIG. 8, the terminal crimping apparatus 100 includes a terminal supply device 101, the crimping device 102, and a driving device 103. The terminal crimping apparatus 100 is an apparatus referred to as an applicator in this technical field. The terminal supply device 101 is a device that supplies the crimping terminal 1 to a predetermined crimping position. The crimping device 102 is a device that crimps the crimping terminal 1 onto the wire 50 at the predetermined crimping position. The driving device 103 is a device that operates the terminal supply device 101 and the crimping device 102.

The terminal supply device 101 pulls out the terminal chain member 30 winded up in a reel shape, sequentially from the outer peripheral side. The terminal supply device 101 supplies the crimping terminals 1 of the pulled-out terminal chain member 30 to crimping positions, sequentially from the forefront side. When the forefront the crimping terminal 1 is crimped onto the wire 50, and cut off from the joint piece 31, the terminal supply device 101 supplies the crimping terminal 1 that newly comes at the forefront, to the crimping position. Each time the crimping process and the cutting process of one crimping terminal 1 are completed, the terminal supply device 101 performs a supply operation to supply the next crimping terminal 1 to the crimping position.

The terminal supply device 101 includes a terminal feeding member 101a and a power transmission mechanism 101b. The terminal feeding member 101a includes a protruding portion to be inserted into the terminal feeding hole 31a of the joint piece 31. The terminal feeding member 101a moves the terminal chain member 30 in the feeding direction in a state in which the protruding portion is inserted into the terminal feeding hole 31a. The power transmission mechanism 101b operates the terminal feeding member 101a in conjunction with a crimping operation performed by the crimping device 102 (up-and-down movement of a ram 114A or the like that is to be described later). The terminal supply device 101 supplies the crimping terminal 1 to the crimping position by moving the terminal feeding member 101a in the up-down direction and the feeding direction in conjunction with the crimping operation of the crimping device 102.

The crimping device 102 executes the crimping process of crimping the supplied the crimping terminal 1 onto the wire 50, and a cutting process of cutting off the crimping terminal 1 from the joint piece 31. The crimping device 102 includes a crimping machine 110 and a terminal cutting mechanism 120.

The crimping machine 110 is a device that crimps the crimping terminal 1 onto the wire 50 by swaging the crimping terminal 1 onto the end portion of the wire 50. The crimping machine 110 of the present embodiment crimps the crimping terminal 1 onto the wire 50 by swaging the first barrel piece portion 15 and the second barrel piece portion 16 of the crimping terminal 1 so as be wound around the core wire 51 and the covering 52 of the wire 50. The crimping machine 110 includes a frame 111, a first mold 112, a second mold 113, and a power transmission mechanism 114.

The frame 111 includes a base 111A, an anvil supporting member 111B, a transmission portion supporting member 111C, and a support base 111D. The base 111A is a member serving as a basis of the terminal crimping apparatus 100. The base 111A is fixed to a placement base on which the terminal crimping apparatus 100 is to be placed. The anvil supporting member 111B, the transmission portion supporting member 111C, and the support base 111D are fixed onto the base 111A.

The transmission portion supporting member 111C is disposed on the rear side (right side on a paper surface in FIG. 8) and on the upper side (upper side on the paper surface in FIG. 8) of the anvil supporting member 111B. More specifically, the transmission portion supporting member 111C includes a standing portion $111C_1$ and a ram supporting portion $111C_2$. The standing portion $111C_1$ is disposed on the rear side of the anvil supporting member 111B, and is vertically standing upward from the base 111A. The ram supporting portion $111C_2$ is held on the upper side of the standing portion $111C_1$. The ram supporting portion $111C_2$ is a supporting portion that supports the ram 114A to be described later. The ram supporting portion $111C_2$ is disposed on the upper side of the anvil supporting member 111B, at a predetermined interval from the anvil supporting member 111B. The support base 111D is a base that supports the terminal connection portion 11 of the crimping terminal 1. A height position of the top surface of the support base 111D is a position substantially similar to a height position of the top surface of the first mold 112.

Figure 10:
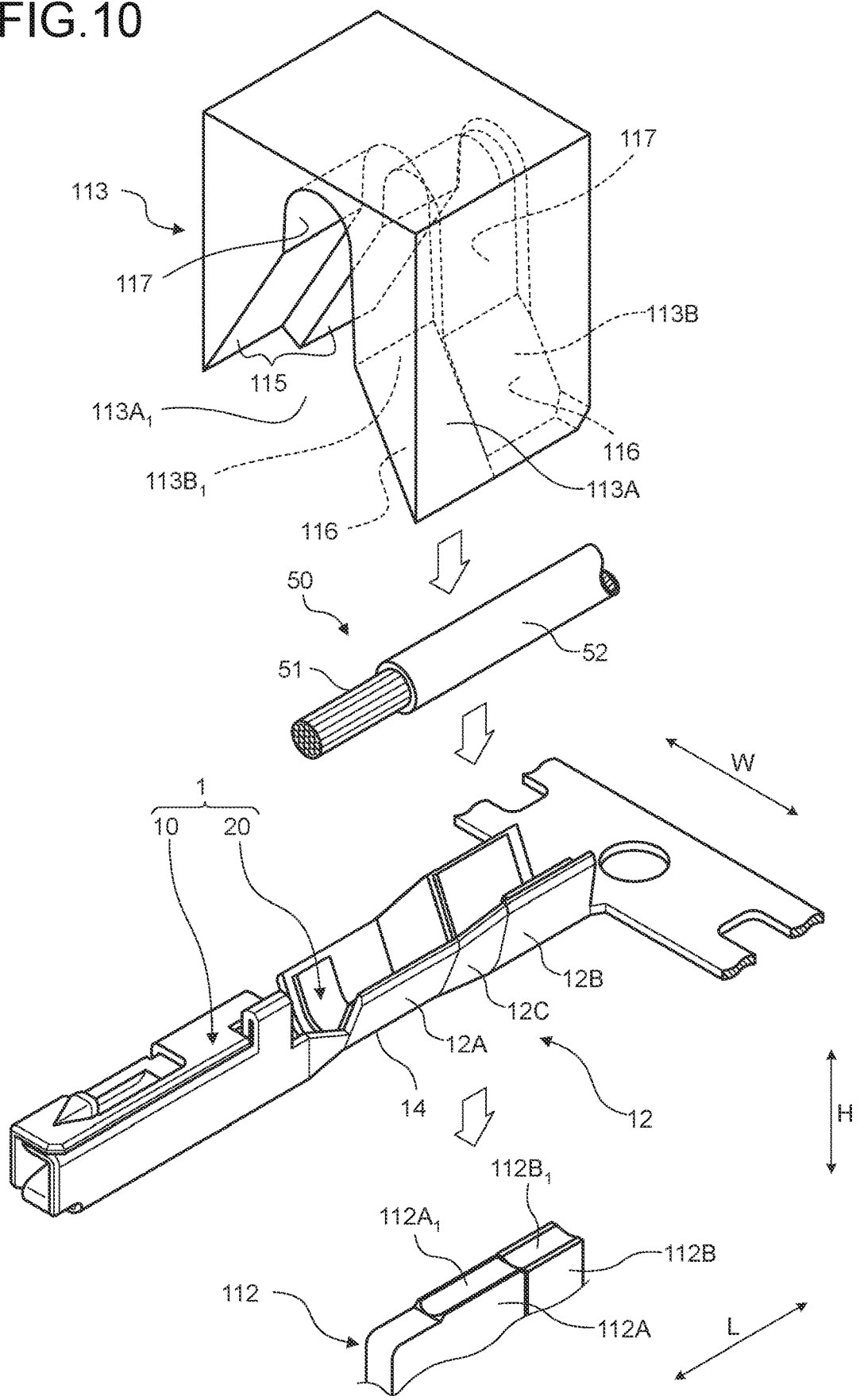
FIG. 10 is a perspective view illustrating first and second molds according to the embodiment.

The first mold 112 and the second mold 113 form a pair. The first mold 112 and the second mold 113 are disposed at an interval in the up-down direction. As illustrated in FIG. 10, the first mold 112 and the second mold 113 crimp the crimping terminal 1 onto the wire 50 by sandwiching the crimping terminal 1 and the wire 50 therebetween. The first mold 112 is a mold that supports the crimping terminal 1 from the lower side. The first mold 112 is formed of two lower molds, and includes a first anvil 112A serving as a first lower mold, and a second anvil 112B serving as a second lower mold. For example, the first anvil 112A and the second anvil 112B are integrally formed. The second mold 113 is disposed on the upper side of the first mold 112. The second mold 113 is formed of two upper molds, and includes a first crimper 113A serving as a first upper mold, and a second crimper 113B serving as a second upper mold.

The first anvil 112A and the first crimper 113A face each other in the up-down direction. The first anvil 112A and the first crimper 113A crimp the core wire crimping portion 12A. More specifically, the first anvil 112A and the first crimper 113A wind the U-shaped core wire crimping portion 12A around the core wire 51 of the wire 50 to crimp the core wire crimping portion 12A onto the core wire 51, by narrowing a distance therebetween.

The second anvil 112B and the second crimper 113B face each other in the up-down direction. The second anvil 112B and the second crimper 113B crimp the covering crimping portion 12B. More specifically, the second anvil 112B and the second crimper 113B wind the U-shaped covering crimping portion 12B around the covering 52 to crimp the covering crimping portion 12B onto the covering 52, by reducing a distance therebetween.

In the crimping process, by transmitting power to the power transmission mechanism 114, the driving device 103 reduces a distance between the first mold 112 and the second mold 113 to crimp the wire connection portion 12 onto the wire 50. On the other hand, when the crimping process is completed, the driving device 103 widens the distance between the first mold 112 and the second mold 113. In the crimping device 102 of the present embodiment, a distance between the pair of molds 112 and 113 is changed by the second mold 113 moving up and down with respect to the first mold 112.

In addition, in the first mold 112, the first anvil 112A and the second anvil 112B may be separately formed, and in the second mold 113, the first crimper 113A and the second crimper 113B may be separately formed. In this case, the driving device 103 and the power transmission mechanism 114 may be configured to separately move the first crimper 113A and the second crimper 113B up and down.

The power transmission mechanism 114 transmits power output from the driving device 103, to the first crimper 113A and the second crimper 113B. As illustrated in FIG. 8, the power transmission mechanism 114 includes the ram 114A, a ram bolt 114B, and a shank 114C.

The ram 114A is a movable member supported so as to be movable up and down with respect to the ram supporting portion $111C_2$. The second mold 113 is fixed to the ram 114A. Thus, the first crimper 113A and the second crimper 113B move up and down integrally with the ram 114A, with respect to the ram supporting portion $111C_2$. For example, the shape of the ram 114A is a parallelepiped. A female screw portion (not illustrated) is formed in the ram 114A. The female screw portion is formed on the inner circumferential surface of a hole in the up-down direction that is formed from an inner side of the ram 114A toward an upper end surface.

The ram bolt 114B includes a male screw portion (not illustrated), and the male screw portion is screwed with the female screw portion of the ram 114A. Thus, the ram bolt 114B moves up and down integrally with the ram 114A, with respect to the ram supporting portion $111C_2$. In addition, the ram bolt 114B includes a bolt head portion $114B_1$ disposed on the upper side of the male screw portion. A female screw portion (not illustrated) is formed in the bolt head portion $114B_1$. The female screw portion of the bolt head portion $114B_1$ is formed on the inner circumferential surface of a hole in the up-down direction that is formed from an inner side of the bolt head portion $114B_1$ toward an upper end surface.

The shank 114C is a cylindrically-shaped hollow member, and includes a male screw portion $114C_1$ and a connection portion (not illustrated) at each end portion. The male screw portion $114C_1$ of the shank 114C is formed on the lower side of the hollow member, and is screwed with the female screw portion of the bolt head portion $114B_1$ of the ram bolt 114B.

Thus, the shank 114C moves up and down integrally with the ram 114A and the ram bolt 114B, with respect to the ram supporting portion $111C_2$. The connection portion of the shank 114C is connected to the driving device 103.

The driving device 103 includes a driving source (not illustrated), and a power conversion mechanism (not illustrated) that converts drive power of the driving source into power in the up-down direction. The connection portion of the shank 114C is joined to an output shaft of the power conversion mechanism. Thus, the first crimper 113A and the second crimper 113B move up and down integrally with the ram 114A, the ram bolt 114B, and the shank 114C, with respect to the ram supporting portion $111C_2$, according to an output of the driving device 103 (output of the power conversion mechanism). As the driving source of the driving device 103, an electrical actuator such as an electrical motor or the like, a hydraulic actuator such as a hydraulic cylinder or the like, an air pressure actuator such as an air cylinder or the like, and the like can be applied.

A relative position in the up-down direction of the first crimper 113A to the first anvil 112A, and a relative position in the up-down direction of the second crimper 113B with respect to the second anvil 112B can be changed by adjusting a screw amount of the female screw portion of the bolt head portion $114B_1$ and the male screw portion $114C_1$ of the shank 114C. A nut 114D is screwed with the male screw portion $114C_1$ of the shank 114C on the upper side of the ram bolt 114B. Thus, the nut 114D functions as a so-called locknut together with the female screw portion of the bolt head portion $114B_1$. By being tightened toward the ram bolt 114B side after the completion of the adjustment of the above-described relative positions, the nut 114D can fix the first crimper 113A and the second crimper 113B at the relative positions.

As illustrated in FIG. 10, recessed surfaces $112A_1$ and $112B_1$ recessed downward are formed at the respective upper distal ends of the first anvil 112A and the second anvil 112B. The respective recessed surfaces $112A_1$ and $112B_1$ are formed so as to have arc-shaped cross sections, in accordance with the respective shapes of the bottom portion 14 of the U-shaped core wire crimping portion 12A and the U-shaped covering crimping portion 12B. In the crimping machine 110, the recessed surfaces $112A_1$ and $112B_1$ each serve as a crimping position. In the crimping terminal 1 supplied with the bottom portion 14 facing downward, the bottom portion 14 of the core wire crimping portion 12A is placed on the recessed surface $112A_1$ of the first anvil 112A, and the bottom portion 14 of the covering crimping portion 12B is placed on the recessed surface $112B_1$ of the second anvil 112B. The first mold 112 is supported by the anvil supporting member 111B in a state in which the recessed surfaces $112A_1$ and $112B_1$ are exposed upward.

As illustrated in FIG. 10, recessed portions $113A_1$ and $113B_1$ recessed upward are respectively formed in the first crimper 113A and the second crimper 113B. The recessed portions $113A_1$ and $113B_1$ are disposed to face the respective recessed surfaces $112A_1$ and $112B_1$ of the first anvil 112A and the second anvil 112B in the up-down direction. Each of the recessed portions $113A_1$ and $113B_1$ includes first and second wall surfaces 115 and 116, and a third wall surface 117. The first wall surface 115 and the second wall surface 116 face each other in the second direction W. The third wall surface 117 connects the upper ends of the first and second wall surfaces 115 and 116. While bringing the first to third wall surface 115, 116, and 117 into contact with the first barrel piece portion 15 and the second barrel piece portion 16, each of the recessed portions $113A_1$ and $113B_1$ winds the first barrel piece portion 15 and the second barrel piece portion 16 around the end portion of the wire 50 to swage thereonto. Each of the recessed portions $113A_1$ and $113B_1$ is formed so as to be able to perform such a swaging operation.

The crimping terminal 1 having been subjected to the crimping processing in the crimping machine 110 is cut off from the joint piece 31 by the terminal cutting mechanism 120. The terminal cutting mechanism 120 cuts the link portion 32 of the crimping terminal 1 supplied to the crimping position by sandwiching the link portion 32 between two terminal cutting portions, and performs the cut off in conjunction with the progress of the crimping process. As illustrated in FIG. 8, the terminal cutting mechanism 120 is disposed on the front side (the left side in on the paper surface in FIG. 8) of the second anvil 112B. The terminal cutting mechanism 120 includes a terminal cutting member 121, a pressing member 122, and an elastic member 123.

Figure 11:
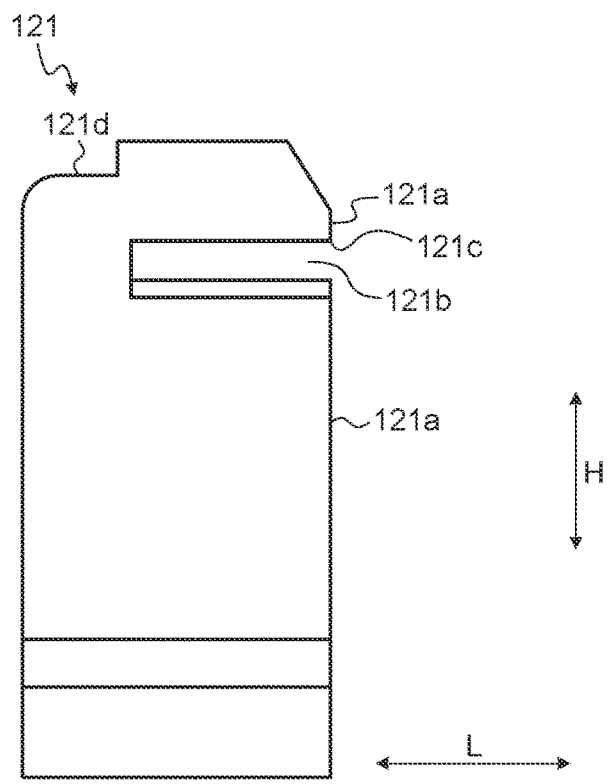
FIG. 11 is a side view illustrating a terminal cutting member according to the embodiment.

The terminal cutting member 121 is formed into a parallelepiped, and is disposed so as to be slidable in the up-down direction along the front surface of the second anvil 112B. As illustrated in FIGS. 11 and 12, a slit 121b is formed in the terminal cutting member 121 from a sliding contact surface 121a with the second anvil 112B toward the inside. The slit 121b is a pathway of the joint piece 31 of the terminal chain member 30. When the crimping target the crimping terminal 1 is supplied to the crimping position, part of the link portion 32 linking to the crimping terminal 1 protrudes from the slit 121b. The crimping terminal 1 supplied to the crimping position is supported by the first mold 112 from the lower side.

The terminal cutting member 121 cuts the link portion 32 while relatively moving up and down with respect to the first mold 112 and the crimping terminal 1. Here, a position at which the joint piece 31 and the like can be inserted into the slit 121b is assumed to be a default position in the up-down direction of the terminal cutting member 121. As illustrated in FIG. 13, an end portion on the wire connection portion 12 side of the link portion 32 protrudes from the slit 121b via an opening on the sliding contact surface 121a side (i.e., the crimping terminal 1 side) of the slit 121b. In the terminal cutting member 121, an edge portion (hereinafter, referred to as an "opening edge".) 121c on the upper side in the opening is used as one terminal cutting portion. The other terminal cutting portion is a top surface edge 112a of the second anvil 112B.

The pressing member 122 is fixed to the ram 114A, and moves up and down integrally with the ram 114A. The pressing member 122 is disposed on the upper side of the terminal cutting member 121, and presses down the terminal cutting member 121 by lowering. The pressing member 122 is formed into a parallelepiped. The elastic member 123 is a member that adds an upper biasing force to the terminal cutting member 121, and is formed of a spring member or the like. The elastic member 123 returns the terminal cutting member 121 to the default position in the up-down direction when pressing force applied from the pressing member 122 is released.

In the terminal cutting mechanism 120, the pressing member 122 lowers together with the lowering of the second mold 113 in the crimping processing, to press down the terminal cutting member 121. By the terminal cutting member 121 lowering, the link portion 32 is sandwiched between the opening edge 121c of the slit 121b and the top surface edge 112a (FIG. 13) of the second anvil 112B. In the terminal cutting mechanism 120, the opening edge 121c and the top surface edge 112a function as scissors, and add shearing force to the link portion 32. By the terminal cutting member 121 being further pressed down, the opening edge 121c and the top surface edge 112a cut the link portion 32, and cut off the crimping terminal 1 from the joint piece 31. In addition, for enhancing cutting performance, the opening edge 121c is inclined on the sliding contact surface 121a with respect to the top surface edge 112a.

As illustrated in FIG. 13, the crimping target the wire 50 is disposed at a predetermined position located between the terminal cutting member 121 and the pressing member 122. More specifically, the wire 50 is placed on a top surface 121d of the terminal cutting member 121. Thus, a space that lets the wire 50 remove is provided in at least one of an upper portion of the terminal cutting member 121 and a lower portion of the pressing member 122 so that the wire 50 is not squished therebetween.

Here, the predetermined position corresponds to a position at which the end portion of the wire 50 not having been subjected to the crimping processing exists on the upper side of the bottom portion 14 of the flat-plate-shaped wire connection portion 12. In addition, the predetermined position is a position at which the core wire 51 can be placed on the bottom portion 14 of the core wire crimping portion 12A so that the distal end of the core wire 51 that has been pressed down at the start of the crimping processing does not protrude from the core wire crimping portion 12A. The core wire 51 extends in an axis line direction in accordance with the crimping processing, and a distal end position of the core wire 51 sometimes moves in the axis line direction. The predetermined position is desirably determined in consideration of the extension.

On the other hand, the end portion (the core wire 51 at the distal end and the covering 52) of the wire 50 is pressed down by the second mold 113 toward the inner wall surface side of the wire connection portion 12. Thus, if no holding is provided, the wire 50 is uplifted from the top surface 121d of the terminal cutting member 121, and the core wire 51 at the distal end and the covering 52 may be crimped in a state of not being placed on the bottom portion 14 of the wire connection portion 12. Thus, the terminal crimping apparatus 100 of the present embodiment is provided with a wire holding mechanism that holds the wire 50 at the predetermined position between itself and the upper portion of the terminal cutting member 121, and suppresses a position shift of the end portion of the wire 50 with respect to the wire connection portion 12 that occurs in the crimping processing.

The wire holding mechanism includes a wire retaining member 118 (FIG. 13) that retains the wire 50 placed on the top surface 121d of the terminal cutting member 121 that serves as a wire placement portion, by pressing the wire 50 against the top surface 121d. The wire retaining member 118 is disposed on the upper side of the terminal cutting member 121, and between the second mold 113 and the pressing member 122. A space (hereinafter, referred to as a "wire holding space".) 118A for holding the covering 52 of the wire 50 is formed between the top surface 121d of the terminal cutting member 121 and the bottom surface of the wire retaining member 118. The wire holding space 118A suppresses the uplift of the wire 50 from the top surface 121d of the terminal cutting member 121 that occurs in the crimping process, and suppresses a position shift of the core wire 51 at the distal end and the covering 52 with respect to the wire connection portion 12. The wire retaining member 118 is a member that can move up and down with respect to the top surface 121d of the terminal cutting member 121, and forms the wire holding space 118A between itself and the upper portion of the terminal cutting member 121 by lowering. For example, the wire retaining member 118 is fixed to the ram 114A, and moves up and down integrally with the ram 114A. The wire 50 is held in the wire holding space 118A formed in accordance with the lowering of the wire retaining member 118.

Figure 14:
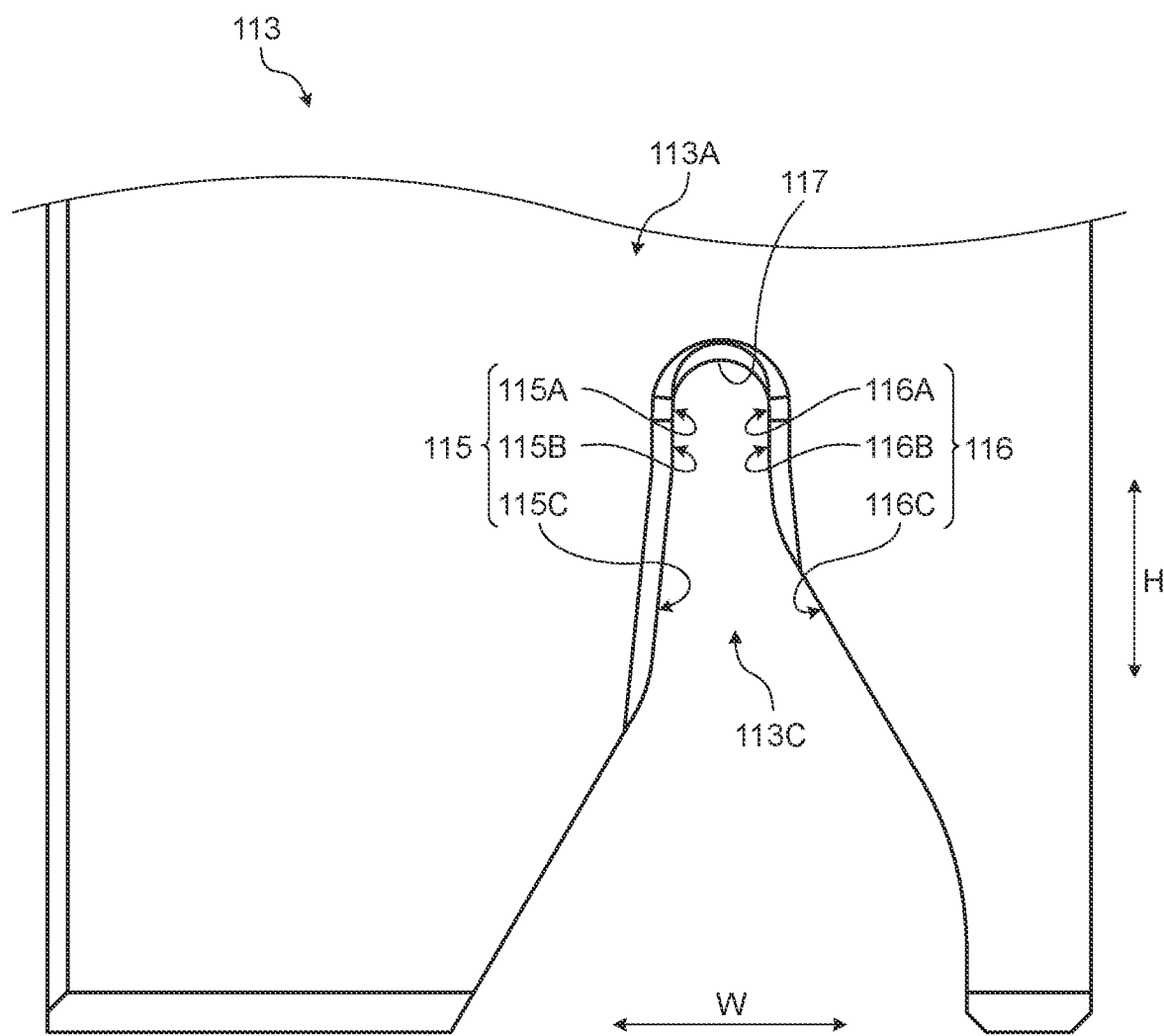
FIG. 14 is a front view illustrating the second mold according to the embodiment.

In the terminal crimping apparatus 100 having the above-described configuration, the second mold 113 has a configuration that can suppress the generation of burr in crimping, as described below. The detailed configuration of the second mold 113 according to the present embodiment will be described with reference to FIGS. 14 and 15. FIG. 14 illustrates a main portion front view obtained by viewing the second mold 113 from the first crimper 113A side. As illustrated in FIG. 14, the second mold 113 includes a recessed wall surface 113C. The recessed wall surface 113C includes the first wall surface 115, the second wall surface 116, and the third wall surface 117. The recessed wall surface 113C is opened downward. More specifically, the recessed wall surface 113C is opened toward the recessed surfaces $112A_1$ and $112B_1$ of the first mold 112.

The first wall surface 115 and the second wall surface 116 are surfaces facing side wall surfaces 112C of the first mold 112, and face each other in the width direction of the crimping terminal 1. The second mold 113 including the first wall surface 115 and the second wall surface 116 is driven by the driving device 103 to reciprocate in the up-down direction. The direction of the reciprocation will be also referred to as a "stroke direction". The first wall surface 115 and the second wall surface 116 face the side wall surfaces 112C of the first mold 112 in a predetermined stroke range of the second mold 113 that includes a lower dead point of the second mold 113. The third wall surface 117 is a wall surface connecting the first wall surface 115 and the second wall surface 116, and is curved upward. In other words, the third wall surface 117 is a surface curved toward an opposite side to the recessed surface $112A_1$ and $112B_1$ of the first mold 112.

Figure 15:
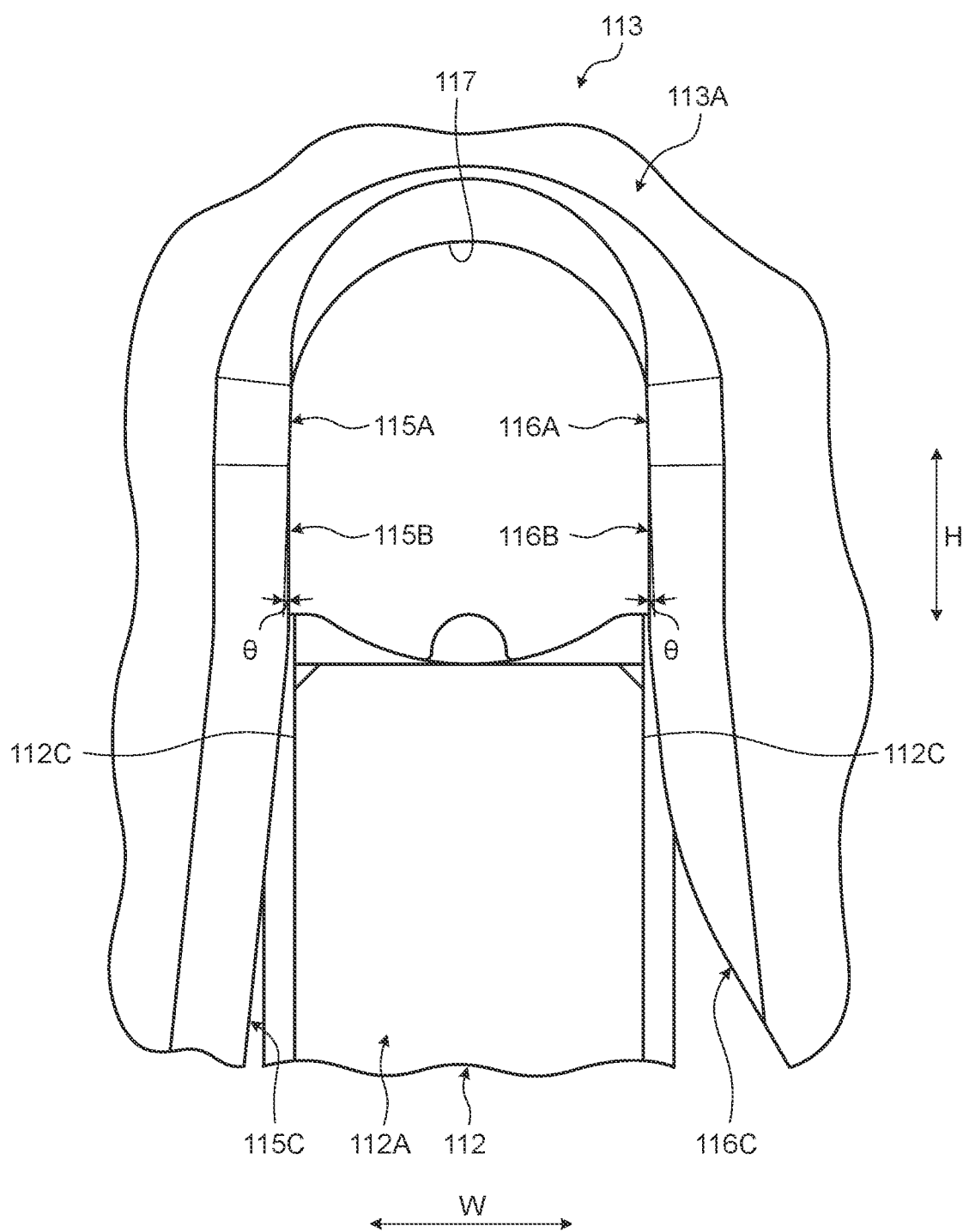
FIG. 15 is a front view illustrating a main portion of the second mold according to the embodiment.

The first wall surface 115 of the present embodiment includes an inclined portion 115A and a parallel portion 115B. The second wall surface 116 includes an inclined portion 116A and a parallel portion 116B. The inclined portions 115A and 116A are positioned at end portions on the third wall surface 117 side of the first wall surface 115 and the second wall surface 116. The inclined portions 115A and 116A are connected to the third wall surface 117. The inclined portions 115A and 116A are inclined with respect to the stroke direction so that an interval in the width direction becomes narrower as going to the third wall surface 117. As illustrated in FIG. 15, the inclined portion 115A of the first wall surface 115 is slightly inclined so as to come closer to the second wall surface 116 as going to the upper side. The inclined portion 116A of the second wall surface 116 is slightly inclined so as to come closer to the first wall surface 115 as going to the upper side. Thus, the inclined portions 115A and 116A are inclined with respect to the third direction H so that an interval in the second direction W becomes narrower as going to the third wall surface 117. In the present embodiment, an inclination angle θ of the inclined portion 115A with respect to the third direction H and an inclination angle θ of the inclined portion 116A with respect to the third direction H are equal.

The parallel portions 115B and 116B extend from the inclined portions 115A and 116A toward an opposite side to the third wall surface 117. The parallel portions 115B and 116B are respectively connected to the inclined portions 115A and 116A. More specifically, upper ends of the parallel portions 115B and 116B are connected to lower ends of the inclined portions 115A and 116A. The parallel portions 115B and 116B are parallel to the third direction H being the stroke direction. In addition, the parallel portion 115B of the first wall surface 115 and the parallel portion 116B of the second wall surface 116 are parallel to each other. In addition, in the first wall surface 115, a hem portion 115C being a portion on the lower side of the parallel portion 115B is inclined with respect to the third direction H so as to go away from the second wall surface 116 toward the lower side. Similarly, in the second wall surface 116, a hem portion 116C being a portion on the lower side of the parallel portion 116B is inclined with respect to the third direction H so as to go away from the first wall surface 115 toward the lower side. Thus, the hem portions 115C and 116C are portions inclined so that an interval in the second direction W becomes wider as going to the lower side.

Figure 16:
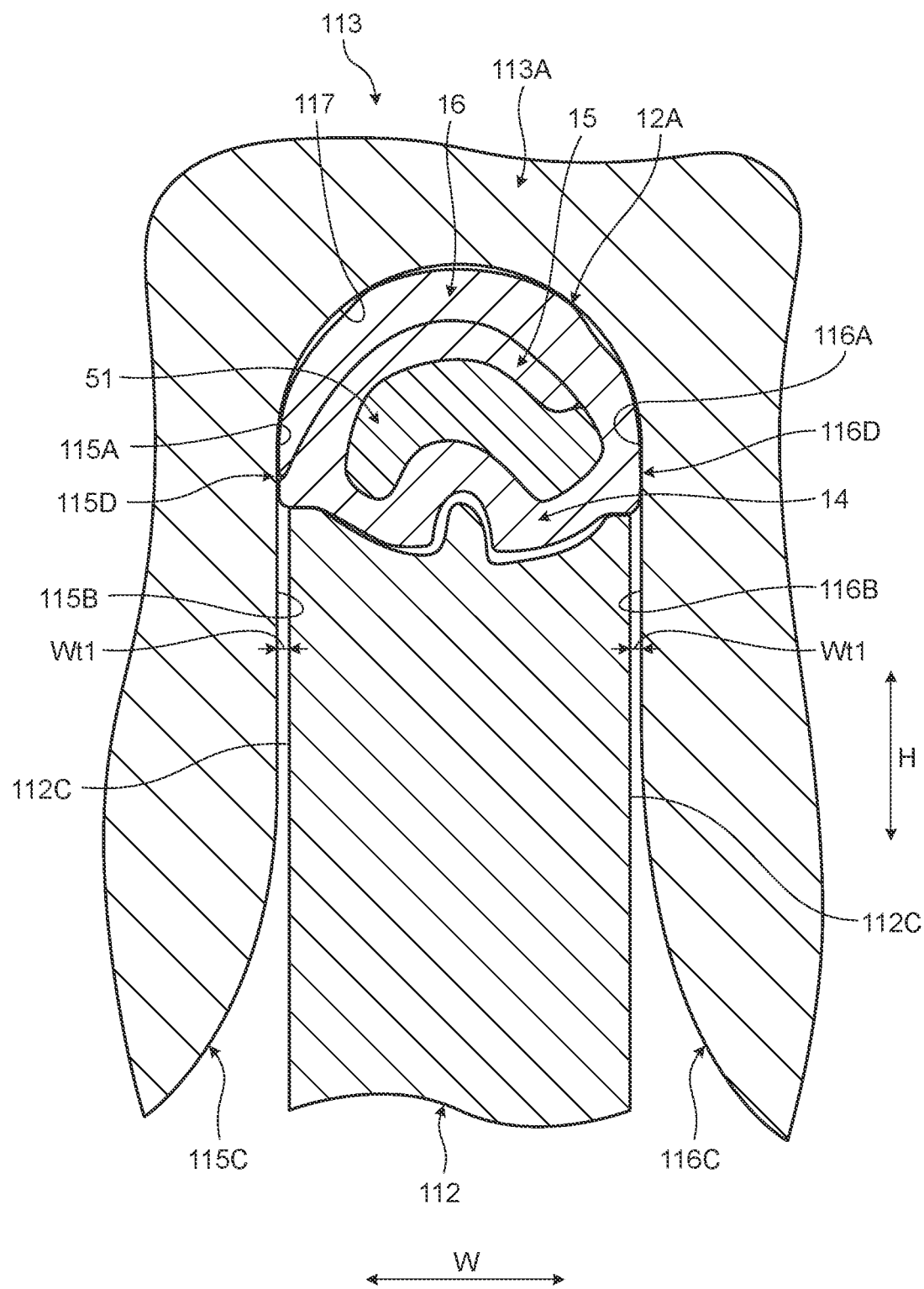
FIG. 16 is a front view illustrating a crimping process performed by the second mold according to the embodiment.

If the second mold 113 having such a configuration lowers toward the first mold 112 in the crimping process, intervals between the wall surfaces 115 and 116 and the side wall surfaces 112C of the first mold 112 vary. FIG. 15 illustrates a state in which the side wall surfaces 112C of the first mold 112 and the hem portions 115C and 116C face each other in the second direction W. In addition, in FIG. 15, the crimping terminal 1 and the wire 50 are not illustrated for easier understanding of the configuration of the second mold 113. If the second mold 113 further lowers from the state illustrated in FIG. 15, as illustrated in FIG. 16, the side wall surfaces 112C of the first mold 112 and the parallel portions 115B and 116B face each other in the second direction W.

Figure 17:
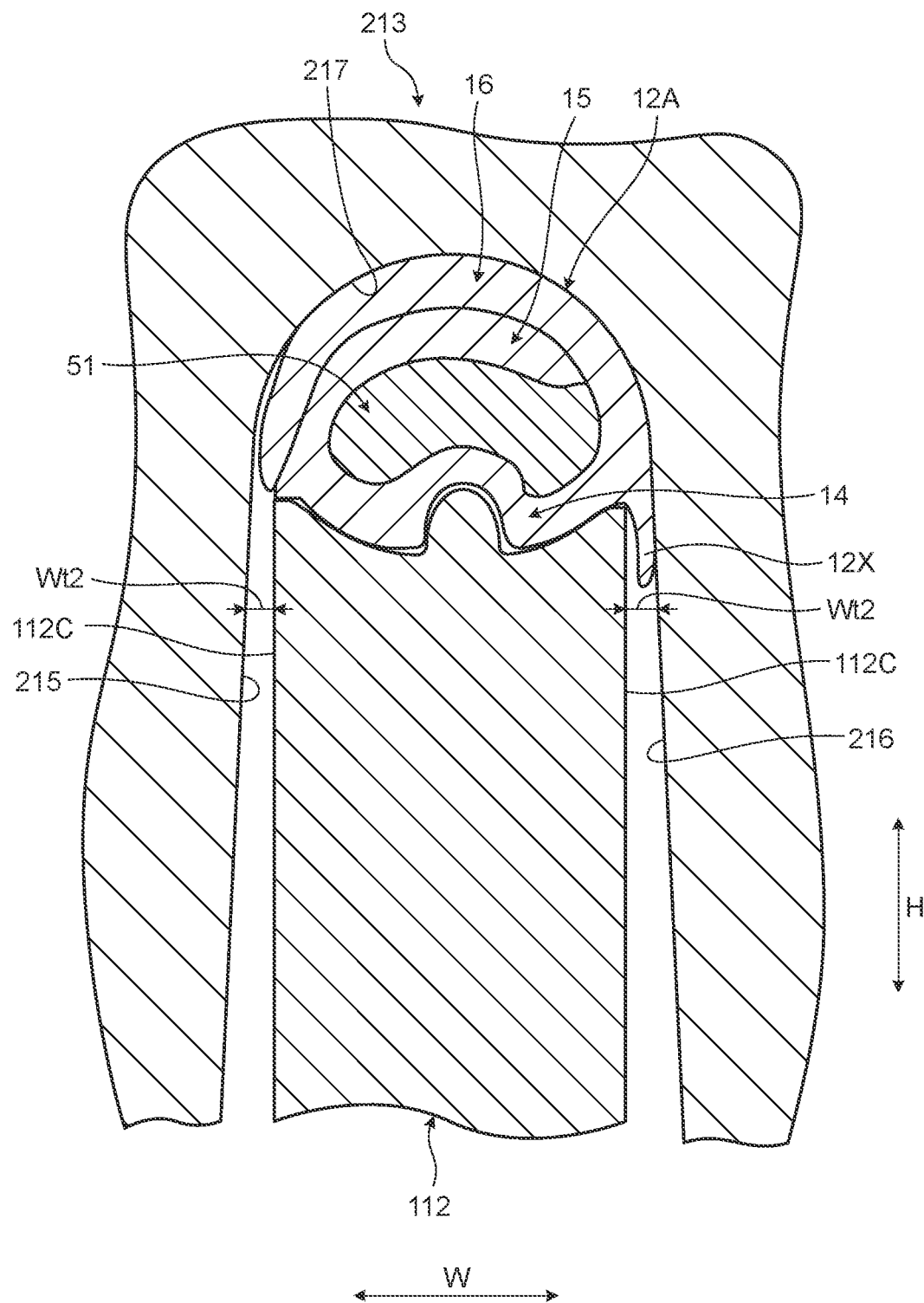
FIG. 17 is a front view illustrating a crimping process performed by a second mold of a comparative example.

The side wall surfaces 112C of the first mold 112 are parallel to the third direction H being the stroke direction. Thus, in the present embodiment, a size Wt1 of clearance gaps between the side wall surfaces 112C and the parallel portions 115B and 116B remains constant along the third direction H. The size Wt1 of the clearance gaps between the side wall surfaces 112C and the parallel portions 115B and 116B is defined so as to be able to suppress the generation of burr in crimping while suppressing interference between the first mold 112 and the second mold 113. FIG. 17 illustrates a second mold 213 of a comparative example. In the second mold 213 of the comparative example, a first wall surface 215 and a second wall surface 216 include no parallel portion. The first wall surface 215 and the second wall surface 216 are connected via a third wall surface 217. In addition, the first wall surface 215 and the second wall surface 216 are inclined so that an interval in the second direction W becomes wider from the third wall surface 217 as going to the lower side.

In the second mold 213 of the comparative example, a size Wt2 of clearance gaps between the wall surfaces 215 and 216 and the side wall surfaces 112C of the first mold 112 becomes smaller in accordance with the lowering of the second mold 213. The size of the clearance gaps becomes the smallest when the second mold 213 reaches a lower dead point. In other words, in the second mold 213 of the comparative example, the size Wt2 of the clearance gaps easily becomes a large value during the crimping. Thus, the wire connection portion 12 is easily drawn into the clearance gaps between the wall surfaces 215 and 216 and the side wall surfaces 112C, and burr 12X is easily generated.

In contrast to this, the second mold 113 of the present embodiment includes the parallel portions 115B and 116B. When a lowering amount of the second mold 113 becomes a predetermined value or more in the crimping process, the parallel portions 115B and 116B and the side wall surfaces 112C face each other as illustrated in FIG. 16. For example, the size Wt1 of the clearance gaps is set to the smallest possible value within a range in which interference between the wall surfaces 115 and 116 and the first mold 112 can be suppressed. For example, the size Wt1 of the clearance gaps is appropriately set based on an expected deformation amount of the molds 112 and 113, and the like. Because the crimping process progresses in a state in which the size Wt1 of the clearance gaps remains small, the burr 12X is difficult to be generated as compared with a case in which the second mold 213 of the comparative example is used.

Figure 18:
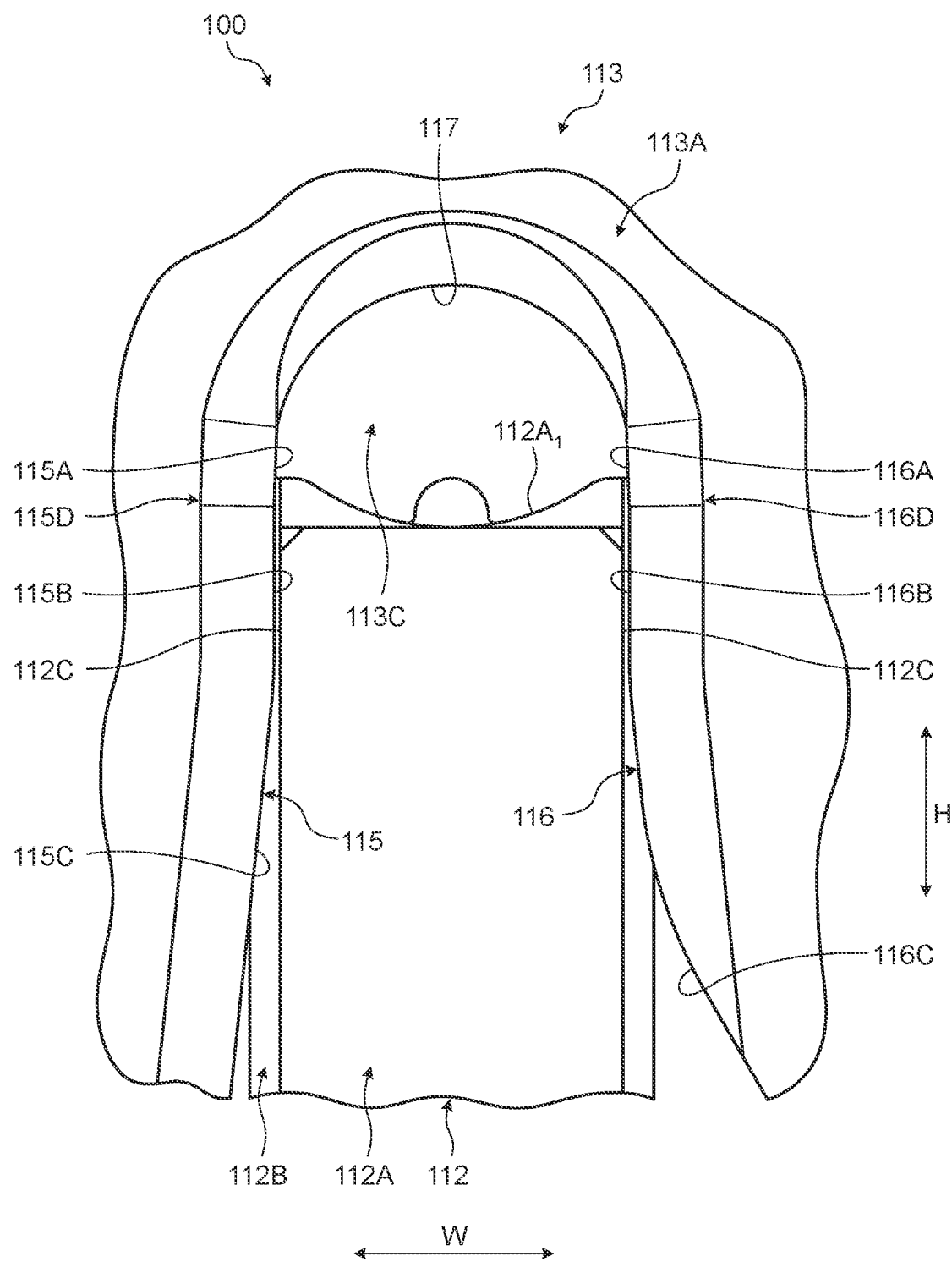
FIG. 18 is a front view illustrating the second mold according to an embodiment that is located at a lower dead point.

In addition, in the second mold 113 of the present embodiment, draft angles are ensured by the inclined portions 115A and 116A. As illustrated in FIG. 18, the second mold 113 has a configuration in which the inclined portions 115A and 116A face the side wall surfaces 112C of the first mold 112 when the second mold 113 is located at the lower dead point. More specifically, when the second mold 113 is located at the lower dead point, at least the upper ends of the side wall surfaces 112C face the inclined portions 115A and 116A. In other words, the second mold 113 has a configuration in which, when the second mold 113 is located at the lower dead point, a boundary 115D between the inclined portion 115A and the parallel portion 115B and a boundary 116D between the inclined portion 116A and the parallel portion 116B are positioned at the same height position as the upper ends of the side wall surfaces 112C, or positioned on the lower side of the upper ends of the side wall surfaces 112C. Draft angles are thereby formed in hem portions 12F (refer to FIG. 19) in the wire connection portion 12. Thus, in the terminal crimping apparatus 100 of the present embodiment, force required for taking out the crimping terminal 1 from the second mold 113 after the crimping is reduced.

An inclination angle of the inclined portions 115A and 116A is appropriately defined so that force to be exerted on the wire connection portion 12 when the wire connection portion 12 is extracted from the second mold 113, so that the crimping does not become excessive. In other words, the draft angles of the inclined portions 115A and 116A are set so that deformation or the like is not generated in the crimping terminal 1 when the wire connection portion 12 is extracted from the second mold 113. In this manner, in the second mold 113 of the present embodiment, the inclined portions 115A and 116A are respectively provided between the third wall surface 117 and the parallel portions 115B and 116B. The second mold 113 provided with the inclined portions 115A and 116A can suppress the generation of the burr 12X while suppressing difficulty in the extraction of the wire connection portion 12.

Figure 19:
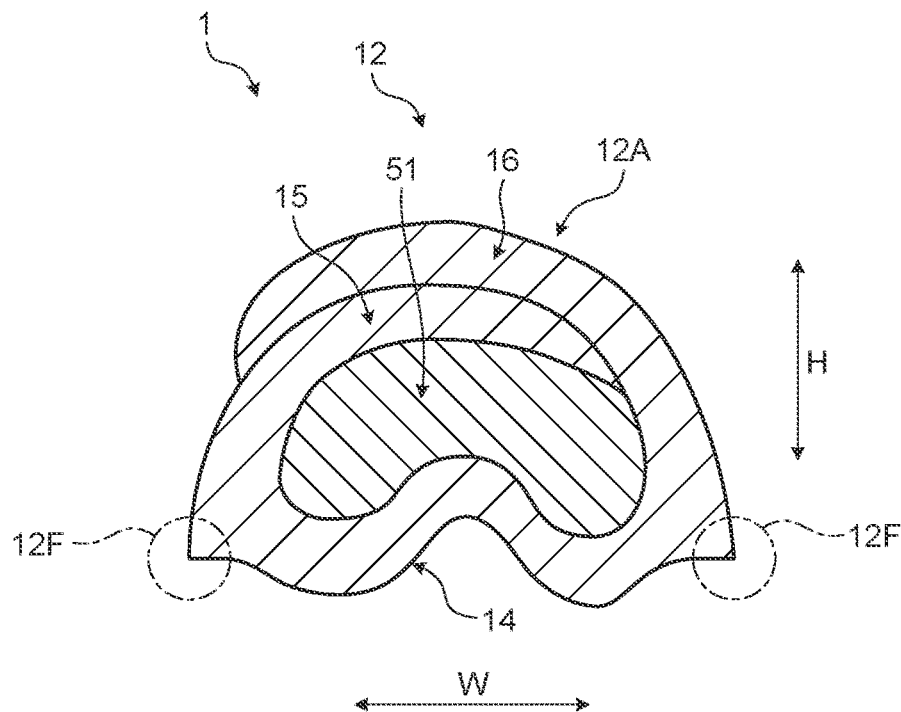
FIG. 19 is a cross-sectional view illustrating the crimping terminal according to the present embodiment that is obtainable after crimping.

In the wire connection portion 12 crimped by the terminal crimping apparatus 100 of the present embodiment, the generation of burr in the hem portions 12F of the barrel piece portions 15 and 16 is suppressed as indicated by portions surrounded by broken lines in FIG. 19. Thus, the crimping terminal 1 of the present embodiment can be easily inserted into a terminal holding portion formed in a housing or the like. In addition, because the generation of the burr 12X is suppressed, there is low possibility that an inner wall surface of the terminal holding portion is damaged.

Figure 20:
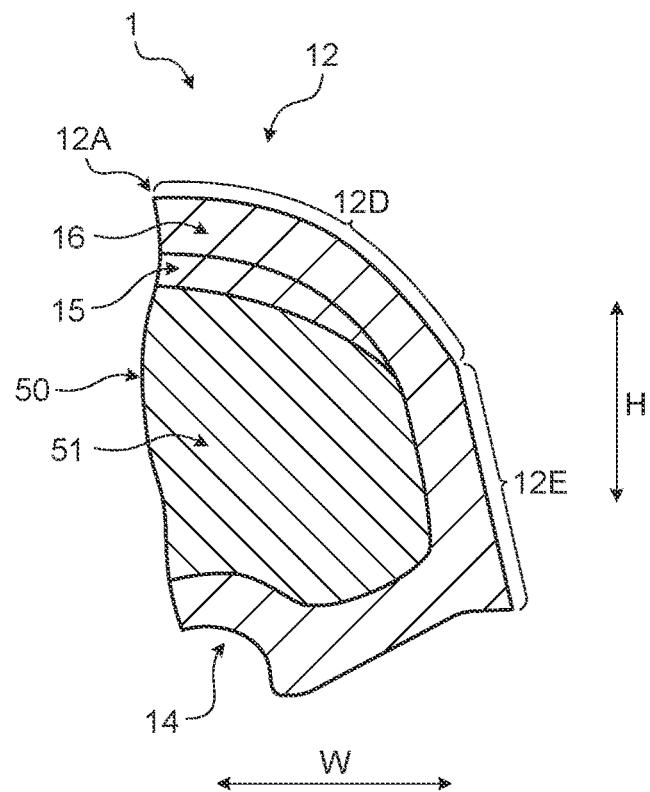
FIG. 20 is an enlarged cross-sectional view illustrating the crimping terminal according to the present embodiment that is obtainable after crimping.

The wire connection portion 12 crimped by the terminal crimping apparatus 100 of the present embodiment has a cross-sectional shape as illustrated in FIG. 20, after the crimping. FIG. 20 illustrates a cross section perpendicular to the axis line direction of the wire 50, that is, a cross section perpendicular to the first direction L. The outer contour of the second barrel piece portion 16 crimped onto the wire 50 includes a curved portion 12D and an inclined portion 12E. The curved portion 12D is formed on the distal end side of the second barrel piece portion 16. The curved portion 12D is a portion facing the bottom portion 14 in the third direction H, and corresponds to a top portion in the crimped wire connection portion 12. The shape of the curved portion 12D has a curved shape corresponding to the third wall surface 117 of the second mold 113.

The inclined portion 12E is a portion having a linear shape in the cross section. The inclined portion 12E is formed on the proximal end side of the curved portion 12D in the second barrel piece portion 16. The inclined portion 12E is positioned closer to the bottom portion 14 side than the curved portion 12D, and is connected to the curved portion 12D. The inclined portion 12E is slightly inclined toward the bottom portion 14 side. More specifically, the inclined portion 12E is inclined toward the first barrel piece portion 15 side in accordance with going way from the bottom portion 14 in the third direction H. The shape and inclination of the inclined portion 12E correspond to the shape and inclination of the inclined portions 115A and 116A of the second mold 113.

FIG. 20 illustrates the curved portion 12D and the inclined portion 12E on the second barrel piece portion 16 side of the wire connection portion 12. Nevertheless, the curved portion 12D and the inclined portion 12E are formed also on the first barrel piece portion 15 side. In other words, the inclined portion 12E of the first barrel piece portion 15 and the inclined portion 12E of the second barrel piece portion 16 spread in the width direction toward the bottom portion 14.

In this manner, the cross-sectional shape of the crimped wire connection portion 12 corresponds to the cross-sectional shape of the recessed wall surface 113C of the second mold 113. Thus, the wire connection portion 12 in which the outer contours of the first barrel piece portion 15 and the second barrel piece portion 16 include curved portions 12D and the inclined portions 12E can be said as the one crimped onto the wire 50 by the terminal crimping apparatus 100 of the present embodiment.

From the viewpoint of suppressing the generation of the burr 12X, it is preferable that, when the second mold 113 lowers, the parallel portions 115B and 116B face the side wall surfaces 112C of the first mold 112 at a relatively-earlier stage. For example, a timing at which the parallel portions 115B and 116B start to face the side wall surfaces 112C is set to a timing at which the portions of the wire connection portion 12 and the portions of the second mold 113 enter predetermined positional relationship in the crimping process.

For example, the parallel portions 115B and 116B may be formed so as to face the side wall surfaces 112C at a time point at which the second barrel piece portion 16 starts contact with the third wall surface 117. The parallel portions 115B and 116B may be formed so as to face the side wall surfaces 112C at a time point at which the first barrel piece portion 15 starts contact with the third wall surface 117. For example, the parallel portions 115B and 116B may be formed so as to face the side wall surfaces 112C at a time point at which the wire connection portion 12 to be compressed starts to get into the clearance gaps between the wall surfaces 115 and 116 and the side wall surfaces 112C, that is, at a time point at which the burr 12X starts to be generated. In accordance with the lowering of the second mold 113 in the crimping process, the wire connection portion 12 and the wire 50 get compressed. If the compression rate becomes higher, the wire connection portion 12 tries to get into the clearance gaps between the wall surfaces 115 and 116 and the side wall surfaces 112C. For example, the parallel portions 115B and 116B may be formed so as to face the side wall surfaces 112C at a time point at which the compression rate reaches a predetermined value.

A timing at which the parallel portions 115B and 116B start to face the side wall surfaces 112C may be defined according to the position of the wire 50. The terminal crimping apparatus 100 of the present embodiment includes the wire holding mechanism that moves toward the first mold 112 together with the second mold 113 while holding the crimping target wire 50. The wire 50 lowering together with the wire holding mechanism is installed in the wire connection portion 12, and is crimped with the wire connection portion 12.

Figure 21:
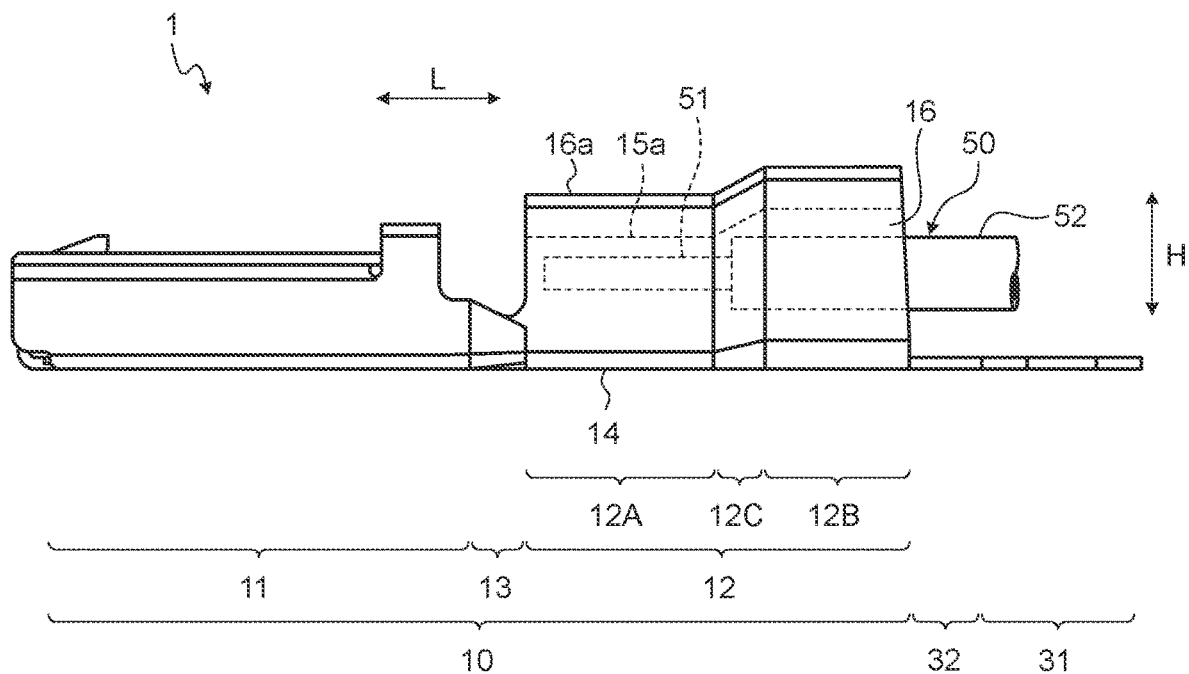
FIG. 21 is a diagram illustrating a timing at which parallel portions start to face side wall surfaces.

For example, as illustrated in FIG. 21, the parallel portions 115B and 116B may be formed so as to face the side wall surfaces 112C of the first mold 112 at a time point at which the core wire 51 of the wire 50 is accommodated into an inner space portion of the barrel piece portions 15 and 16. In the wire 50 illustrated in FIG. 21, the core wire 51 is positioned below the end surface of the distal end 15a of the first barrel piece portion 15. In other words, the core wire 51 is in a state of being accommodated in the space portion between the first barrel piece portion 15 and the second barrel piece portion 16. If the parallel portions 115B and 116B and the side wall surfaces 112C are formed to start to face each other at the time point at which the core wire 51 is accommodated into the inner space portion of the barrel piece portions 15 and 16 in this manner, a winding start of the barrel piece portions 15 and 16 with respect to the wire 50 is appropriately set.

Figure 22:
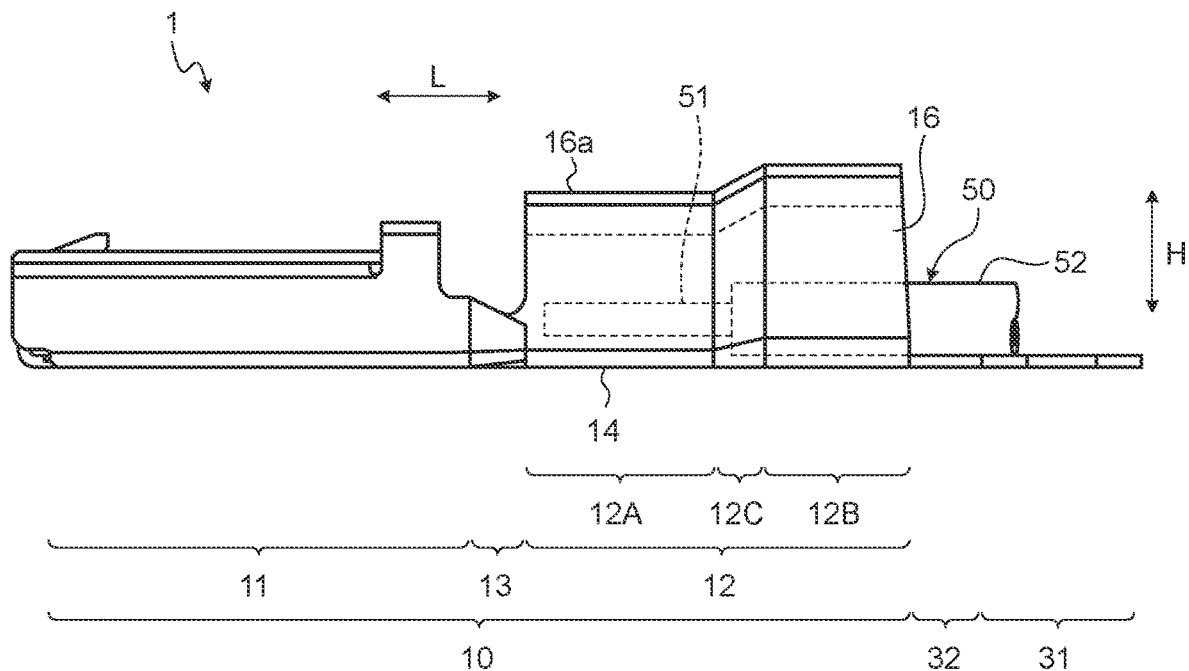
FIG. 22 is another diagram illustrating a timing at which parallel portions start to face side wall surfaces.

In addition, as illustrated in FIG. 22, the parallel portions 115B and 116B may be formed so as to face the side wall surfaces 112C of the first mold 112 at a time point at which the wire 50 comes into contact with the bottom portion 14 of the wire connection portion 12. In the wire 50 illustrated in FIG. 22, the covering 52 is in contact with the bottom portion 14. If the parallel portions 115B and 116B and the side wall surfaces 112C are formed to start to face each other at the time point at which the wire 50 comes into contact with the bottom portion 14 in this manner, a winding start of the barrel piece portions 15 and 16 with respect to the wire 50 is appropriately set. In addition, a timing at which the parallel portions 115B and 116B start to face the side wall surfaces 112C may be a time point at which the core wire 51 comes into contact with the bottom portion 14.

Figure 23:
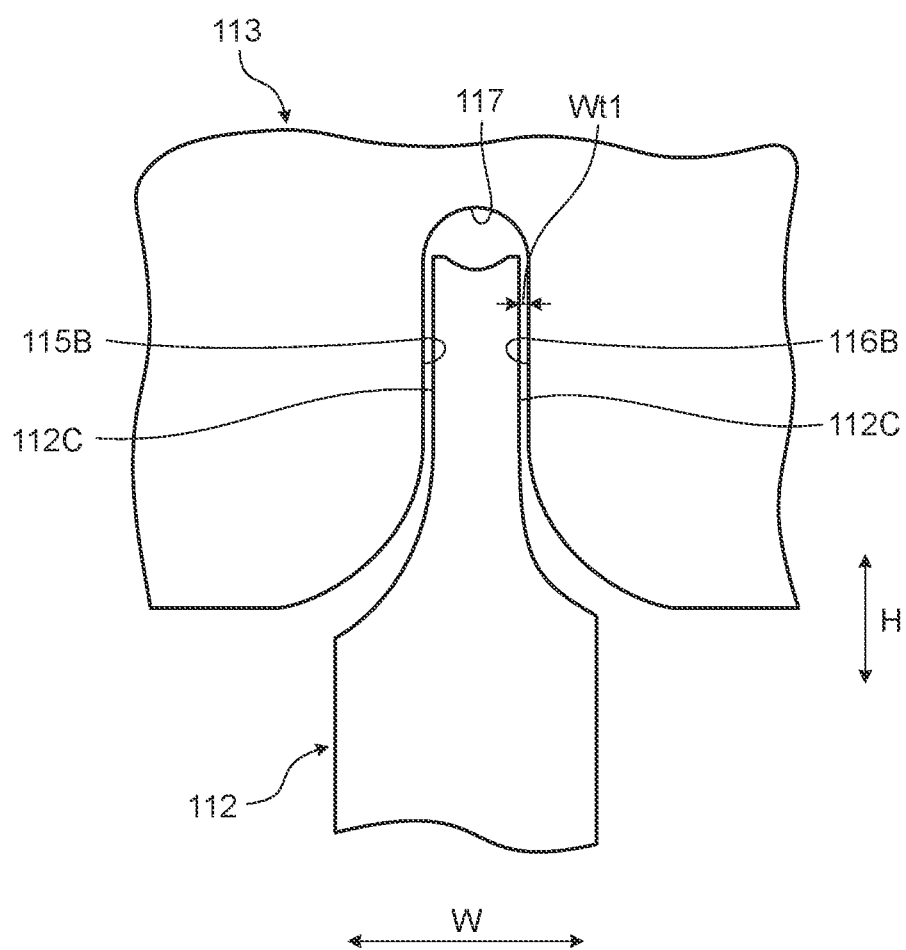
FIG. 23 is a front view illustrating a state in which the parallel portions face the first mold.

The second mold 113 of the present embodiment can suppress deformation of the first mold 112. As illustrated in FIG. 23, the parallel portions 115B and 116B of the second mold 113 face the side wall surfaces 112C of the first mold 112. In addition, the parallel portions 115B and 116B are assumed to be surfaces parallel to the side wall surfaces 112C. In the crimping process, the second mold 113 is pressed against the first mold 112. In accordance with the lowering of the second mold 113, load applied to the first mold 112 increases. When the second mold 113 reaches the lower dead point, a large load is applied to the first mold 112. The second mold 113 of the present embodiment can support the first mold 112 from the both sides in the width direction using the parallel portions 115B and 116B. In the second mold 213 (refer to FIG. 17) of the comparative example, because the size Wt2 of the clearance gaps is large, the deformation in the width direction of the first mold 112 is easily allowed.

In contrast to this, in the second mold 113 of the present embodiment, the size Wt1 of the clearance gaps between the parallel portions 115B and 116B and the side wall surfaces 112C is small. Thus, the second mold 113 of the present embodiment can regulate deformation in the width direction of the first mold 112. In addition, the second mold 113 comes into contact with the first mold 112 at a stage at which an amount of deformation in the width direction of the first mold 112 is still small, so that the second mold 113 can regulate further deformation of the first mold 112. Thus, the second mold 113 of the present embodiment can stabilize a crimping shape in crimping the wire connection portion 12. The parallel portions 115B and 116B preferably have enough lengths in the third direction H to such a degree as to be able to have surface contact with the side wall surfaces 112C of the first mold 112 to support the first mold 112.

In the terminal crimping apparatus 100 of the present embodiment, the above-described parallel portions 115B and 116B and the inclined portions 115A and 116A are provided in the first crimper 113A, and are not provided in the second crimper 113B. As illustrated in FIG. 10, the second crimper 113B is a mold that swages the covering crimping portion 12B. The compression rate at which the second crimper 113B compresses the covering crimping portion 12B and the wire 50 is lower than the compression rate at which the first crimper 113A compresses the core wire crimping portion 12A and the wire 50. Thus, in the present embodiment, the parallel portions 115B and 116B and the inclined portions 115A and 116A are provided in the first crimper 113A, among the first crimper 113A and the second crimper 113B. For example, the first wall surface 115 and the second wall surface 116 of the second crimper 113B are inclined so that an interval in the second direction W becomes wider from the third wall surface 117 as going to the lower side.

In addition, the material of the core wire 51 of the wire 50 is not limited to aluminum. For example, the core wire 51 may be copper or copper alloy, or another conductive metal. The material of the crimping terminal 1 is not limited to copper and copper alloy, and may be another conductive metal.

Modified Example of Embodiment

A modified example of the embodiment will be described. The shapes of the first mold 112 and the second mold 113 are not limited to those illustrated in the drawings. For example, the third wall surface 117 of the above-described embodiment is curved into an arc shape. Nevertheless, the shape is not limited to this. The plurality of inclined portions 115A and 116A may be provided on the wall surfaces 115 and 116. For example, the plurality of inclined portions 115A having different inclination angles may be provided on the first wall surface 115, or the plurality of inclined portions 116A having different inclination angles may be provided on the second wall surface 116. A height position of the inclined portion 115A on the first wall surface 115 and a height position of the inclined portion 116A on the second wall surface 116 may be different.

Note that the matters disclosed in the above-described embodiment and the modified example can be executed while being appropriately combined.

A terminal crimping apparatus carrying out the method of manufacturing a wire with a terminal according to the present embodiment includes a first mold including a supporting surface supporting a crimping terminal including a bottom wall portion, and a pair of side wall portions facing each other in a width direction of the bottom wall portion, and protruding from both ends in the width direction of the bottom wall portion, a second mold disposed to face the supporting surface, and including a recessed wall surface opened toward the supporting surface, on a surface facing the supporting surface, and a driving device configured to reciprocate the second mold in a stroke direction being a direction in which the supporting surface and the second mold face each other.

The recessed wall surface includes a first wall surface and a second wall surface that are configured to face side wall surfaces of the first mold, and are facing each other in the width direction, and a third wall surface linking the first wall surface and the second wall surface, and curved toward an opposite side to the supporting surface. The first wall surface and the second wall surface include inclined portions and parallel portions. The inclined portions are positioned at end portions on the third wall surface side of the first wall surface and the second wall surface, and inclined with respect to the stroke direction so that an interval in the width direction becomes narrower as going to the third wall surface. The parallel portion of the first wall surface and the parallel portion of the second wall surface extend from the inclined portions toward an opposite side to the third wall surface side, and are parallel to the stroke direction.

The side wall surfaces of the first mold face the inclined portions in a state in which the first mold and the second mold come closest to each other in the stroke direction. According to the terminal crimping apparatus carrying out the method of manufacturing a wire with a terminal according to the present embodiment, in the side wall portions of a crimped crimping terminal, a shape of hem portions provided on the bottom wall portion side becomes an inclined shape corresponding to the inclined portions of the second mold. Thus, the terminal crimping apparatus of the present embodiment brings about such an effect that force required for taking out the crimped crimping terminal can be reduced.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing a wire with a terminal comprising:
   a crimping process of crimping a crimping terminal on a wire by a terminal crimping apparatus that includes;
   a first mold including a supporting surface that supports the crimping terminal including a wire connection portion having a bottom wall portion and a pair of side wall portions that faces each other in a width direction of the bottom wall portion and protrudes from both ends in the width direction of the bottom wall portion;
   a second mold disposed to face the supporting surface, and including a recessed wall surface opened toward the supporting surface, on a surface facing the supporting surface; and
   a driving device configured to reciprocate the second mold in a stroke direction being a direction in which the supporting surface and the second mold face each other, wherein
   the recessed wall surface includes a first wall surface and a second wall surface that are configured to face side wall surfaces of the first mold, and are facing each other in the width direction, and a third wall surface connecting the first wall surface and the second wall surface, and curved toward an opposite side to the supporting surface, the first wall surface, the second wall surface, and the third wall surface defining a recessed space in the second mold, the first wall surface and the second wall surface include inclined portions and parallel portions, the inclined portions are positioned at end portions of the third wall surface side on the first wall surface and the second wall surface, and inclined with respect to the stroke direction so that an interval in the width direction becomes narrower as going to the third wall surface, the parallel portions extend from the inclined portions toward an opposite side to the third wall surface side, and are parallel to the stroke direction, in the crimping process, the driving device moves the second mold in the stroke direction such that the first mold extends into the recessed space in the second mold and the side wall surfaces of the first mold are located between the parallel portion of the first wall surface and the parallel portion of the second wall surface, and in the crimping process, the side wall surfaces of the first mold face the inclined portions such that boundaries between the inclined portions and the third wall surface are positioned on the upper side than upper ends of the side wall surfaces of the first mold and boundaries between the inclined portions and the parallel portions are positioned on a lower side than the upper ends of the side wall surfaces of the first mold in a state in which the first mold and the second mold come closest to each other in the stroke direction.

2. The method according to claim 1, wherein the terminal crimping apparatus further comprises:

a wire holding mechanism configured to move toward the first mold together with the second mold while holding a crimping target wire, and in the crimping process, the parallel portions face the side wall surfaces of the first mold side at a time point at which a core wire of the wire is accommodated into an inner space portion of the pair of side wall portions.

3. The method according to claim 1, wherein the terminal crimping apparatus further comprises:

a wire holding mechanism configured to move toward the first mold together with the second mold while holding a crimping target wire, and in the crimping process, the parallel portions face the side wall surfaces of the first mold side at a time point at which the wire comes into contact with the bottom wall portion.

* * * * *